United States Patent [19]

Richardson et al.

[11] Patent Number: 4,855,940
[45] Date of Patent: Aug. 8, 1989

[54] METHOD OF AND SYSTEM FOR COMPUTER GRAPHIC PHOTOGRAPHY

[75] Inventors: Thomas L. Richardson, Winchester; Vernon Grabel, Cotuit; Joseph T. Kowalik, Charlestown, all of Mass.

[73] Assignee: Polaroid Corporation, Cambridge, Mass.

[21] Appl. No.: 3,869

[22] Filed: Jan. 16, 1987

[51] Int. Cl.⁴ .................... G03B 15/00; G03B 27/80; G03B 33/06
[52] U.S. Cl. .................... 364/526; 364/525; 364/571.07; 340/703; 355/20; 358/244
[58] Field of Search .................... 364/525, 526, 571.07; 358/244, 244.1, 244.2, 242; 354/75, 76, 77; 340/793, 728, 703; 355/20

[56] References Cited

U.S. PATENT DOCUMENTS

| | | | |
|---|---|---|---|
| 3,116,436 | 12/1963 | Sweeney | 315/18 |
| 4,121,283 | 10/1978 | Walker | 364/200 |
| 4,200,867 | 4/1980 | Hill | 340/703 |
| 4,360,805 | 11/1982 | Andrews et al. | 358/244 |
| 4,438,453 | 3/1984 | Alston | 358/788 |
| 4,439,759 | 3/1984 | Fleming et al. | 340/703 |
| 4,468,693 | 8/1984 | Fujita et al. | 358/78 |
| 4,473,849 | 9/1984 | Cool | 358/244 |
| 4,482,919 | 11/1984 | Alston et al. | 358/152 |
| 4,488,244 | 12/1984 | Freeman | 364/523 |
| 4,534,059 | 8/1985 | Yamada | 382/54 |
| 4,536,848 | 8/1985 | d'Entremont et al. | 364/526 |
| 4,559,535 | 12/1985 | Watkins et al. | 340/793 |
| 4,649,433 | 3/1987 | Verhoeven | 358/244 |
| 4,660,156 | 4/1987 | Grittag et al. | 364/521 |
| 4,673,929 | 6/1987 | Nelson et al. | 340/703 |
| 4,704,699 | 11/1987 | Farina et al. | 364/525 |

OTHER PUBLICATIONS

"Film Recorders Product Comparison" publication by Furger et al., in Info World 3/21/88, pp. 53-59.

Primary Examiner—Parshotam S. Lall
Assistant Examiner—S. A. Melnick
Attorney, Agent, or Firm—David R. Thornton; James R. Gaffey; Edward S. Roman

[57] ABSTRACT

A method of and system for defining and photographing computer graphic images involves using photographic exposure adaptor (PXA) circuitry, providing an interface between a computer having a CPU and a film printer. The interface circuitry includes a page register. A cathode ray tube controller is operatively arranged to provide address, vertical synchronization and horizontal synchronization signals when an image is being displayed on a CRT in the film printer. A display random access memory array is operatively arranged to be filled with pixel data under control of the CPU. When an image is to be displayed, control of the array is given to the controller. A multiplexer selects addressing lines to the array. A display random access memory data buffer enables output from the array to be placed on the internal data bus. An exposure mapping table is operatively arranged to be accessed by either the CPU or the controller. An address multiplexer supplies addresses from either output from the array or from an internal address bus on which appears output from the system interface. A bidirectional exposure mapping table data buffer allows locations in the mapping table to be read by the CPU. Output from the table is fed to a pixel shift register which generates video data. The system is used to carry out methods whch allow color resolution to be exchanged for spatial resolution, different resolutions to be achieved and image storage requirements made to depend on exposure time.

55 Claims, 10 Drawing Sheets

| LEVEL | RED EXPOSURE | GREEN EXPOSURE | BLUE EXPOSURE |
|---|---|---|---|
| 0 | 0 | 0 | 0 |
| 1 | 2 | 1 | 1 |
| 2 | 4 | 2 | 2 |
| 3 | 8 | 3 | 4 |
| ... | ... | ... | ... |
| 31 | 80 | 53 | 75 |

*FIG. 7*

METHOD OF AND SYSTEM FOR COMPUTER GRAPHIC PHOTOGRAPHY

BACKGROUND OF THE INVENTION

1. Field of the Invention

The invention relates generally to a method of and system for defining and photographing computer graphic images, including color images. More particularly, the present invention relates to a method of and an apparatus for defining and photographing computer graphic colored images wherein an exposure mapping table may be used to exchange color resolution for spatial resolution and/or different vertical resolutions may be achieved and/or image storage requirement may be made to depend on exposure time.

2. The Prior Art

In U.S. Pat. No. 4,536,848, entitled "Method and Apparatus for Colored Computer Graphic Photography" of Alice M. d'Entremont et al., granted Aug. 20, 1985, there is disclosed a method of and apparatus for making and photographing computer graphic colored images by defining each computer graphic colored image as a plurality of constant color pixel groups. One of a preselected number of colors is assigned to each pixel group and a photosensitive material is exposed to each constant color pixel group in a predetermined ordered sequence and color. The photosensitive material is constituted by a film, the exposure being effective via respective red, green and blue filters mounted on a rotatable wheel. Images from a black-and-white cathode ray tube are projected onto the film via the filters. The known method involves the steps of first defining and storing within a computer memory the graphic image to be photographed as a plurality of constant color pixel groups. The time during which selected photosensitive material must be exposed to a selected light color intensity for each of the constant color pixel groups is next determined. The determined exposure times are then ordered for each of the constant color pixel groups into either a progressively increasing or decreasing sequence. Each of the constant color pixel groups are thereafter visually displayed at the selected light color and intensity for its determined exposure time to the photosensitive material. The visual display may start with the first of the constant color pixel groups in the ordered sequence and thereafter add each succeeding constant color pixel group in the ordered sequence to the visual display so as to finally display all of the constant color pixel groups simultaneously in the ordered sequence when the ordered sequence involves progressively decreasing exposure times. Alternatively, the visual display may start by simultaneously displaying all the constant color pixel groups in the ordered sequence and thereafter eliminating from the visual display each succeeding constant color pixel group in the ordered sequence so as to finally display only the last of the constant color pixel groups in the ordered sequence when the ordered sequence involves progressively increasing exposure times.

The apparatus and method disclosed in the Letters Patent of d'Entremont, et al. supra, is limited in flexibility. Color and horizontal spatial resolution are fixed. Vertical resolution also is fixed for any given single film recorder. Image storage requirements depend on the number of exposure levels.

Cathode ray tube (CRT) graphics apparatuses have used a technique, well known in the art, for increasing the vertical resolution of a display with an "interlaced" image; an example of this known technique is disclosed in U.S. Pat. No. 4,482,919 entitled "Apparatus for Obscuring Blank Spaces Between Raster Lines and Hard Copies Made from Screen CRT" of Lawrence E. Alston et al. granted Nov. 13, 1984. When an image is interlaced in accordance with this known technique, two fields are required to display the entire image. The first field displays all of the even scan lines and the second field displays all of the odd scan lines. Two vertical scans, then, are required to display the entire image. A disadvantage of this approach is that it may cause an objectionable "flicker" in the display. For this reason, graphics devices have either used a two field interlace as described above or none at all.

The known graphics apparatuses of the type disclosed in the Letters Patent of Alston et al., supra, do not provide the capability to specify more than two fields in an image. The image is either not interlaced or is interlaced as a two-field image, a distinct shortcoming and disadvantage when such devices are used in conjunction with film printers and high resolution is desired.

Of interest as general background information in the field of making and photographing computer graphics colored images is U.S. Pat. No. 4,488,244 of William T. Freeman entitled "Computer Graphic System with Foreground/Background Discrimination" and granted Dec. 11, 1984. The Letters Patent of Freeman, supra disclose a method and system in which each computer graphic image is defined as a plurality of constant color pixel groups. Also of general background interest, is a known method and apparatus in which video signals are converted into a number of two-level brightness distributions on the screen of a CRT. Such a method and apparatus is disclosed in U.S. Pat. No. 4,438,453 of Lawrence E. Alston entitled "Constant Light Greyscale Generator for CRT Color Camera System" granted Mar. 20, 1984.

The architecture of a conventional graphics controller without a color lookup table is illustrated in FIG. 8A. Each display memory location corresponds to one pixel and contains the RGB display values of that pixel. In this type of architecture there is a memory location for each pixel that is displayed, and the contents of this memory location contain the red, green and blue (RGB) color levels which should appear on the display. For example, a display adapter available under the designation Targa TM 16 from American Telephone and Telegraph Company, which utilizes this conventional architecture, stores two bytes of information for each pixel. This approach allows five bits for each primary color and hence 32 levels for each primary color. This type of architecture has serious drawbacks for the type of algorithms used in practicing the present invention. The major difficulty is the amount of time required to modify all pixels of a given color since the whole display memory needs to be searched for the required pixels.

A conventional lookup table architecture is illustrated in FIG. 8B. Each display memory location corresponds to one pixel and contains an index into a table. The index selects which of the RGB values in the table will be displayed for a given pixel. Again, there is a memory location for each pixel which is display; however, in this case, the contents of this memory location contain an index into a color lookup table. The contents of this lookup table indicate the color that is to be displayed. A typical example of this type of architecture is the display adaptor available under the designation VDA/D from American Telephone and Telegraph Company. In this known adaptor one byte is allocated to each pixel, giving 256 possible indices into the lookup table. The 256 entries in the lookup table each contain two bytes, allowing five bits for each primary color. If the memory contents for a given pixel contain the number 119, for example, then the color on the display for that pixel is determined by RGB values in entry 119 of the color lookup table. It is easy to modify all pixels of a given color. To change all pixels with index 119 for example, it is only necessary to change the contents of entry 119 in the color lookup table. While more suitable, this approach does not utilize exposure mapping table architecture, as does the present invention.

SUMMARY OF THE INVENTION

An object of the present invention is to provide a method of and a system for color computer graphic photography in which image color resolution may be traded for spatial resolution.

Another object of the present invention is to provide a method of and system for computer graphic photography in which different resolution images can be produced on a given, single film recorder.

An additional object of the present invention is to provide a method of and a system for computer graphic photography in which storage requirements depend on maximum exposure time instead of the number of exposure levels.

A further object of the present invention is to provide an exposure adapting circuit as an interface between a computer and a film recorder and which, with the computer and film recorder, may constitute an exemplary system in accordance with the present invention and which may be used in carrying out the method thereof.

In its method aspect from one vantage point, the present invention is achieved by a sixteen-step method of colored computer graphic photography involving (1) extracting a color component of an input image, (2) dividing the color component into a plurality of interlaced fields, (3) transforming each field into a photographic exposure adaptor (PXA) format and storing the formatted field in a memory of the PXA, and (4) turning the filter wheel of a film printer. The fourth step is followed by (5) setting each level of an exposure mapping table (EMT) respectively to off or on, (6) turning on a cathode ray tube (CRT) in the film printer, (7) setting variable current color level (CLEVEL) respectively to the highest or lowest color level of the extracted color component, (8) determining number of exposure frames (NFRAMES) for all pixels in all fields of the CLEVEL from a lookup table, and (9) waiting for a video signal vertical synchronization (VSYNC) blanking period. Thereafter, the method involves (10) updating the EMT respectively to display or turn off pixels of the CLEVEL, (11) displaying each field of the image for one frame in an interlaced manner, (12) repeating step (11) until each field has been exposed NFRAMES, and (13) respectively decrementing or incrementing the CLEVEL. Subsequently, the method involves (14) repeating steps (8)-(13) until the CLEVEL reaches respectively the lowest or highest color level, (15) turning off the CRT of the film printer, and (16) repeating steps (1)-(15) for each other primary color. Step (2) in conjunction with step (11) allows the system to handle images having different vertical resolutions. Step (3) in conjunction with step (10) allows a tradeoff between color resolution and spatial resolution.

In the case in which the number of desired color levels per pixel will not fit in the PXA memory allocated for each pixel in a field, the present invention in its method aspect is achieved by a twenty-step method, fourteen of the steps corresponding to steps in the above-noted sixteen-step method.

In the case in which the image storage requirement is to be made to depend on exposure time, the present invention in its method aspect is achieved by a twenty-one step method, seventeen of the steps corresponding to steps in the above-noted twenty-step method.

It is to be understood that the above-noted summarized methods can be modified to apply to black-and-white or single color computer graphic photography by, in essence, eliminating the color separating related steps and eliminating the repeating of the steps so that they are not applied separately for each primary color.

In its system aspect, the present invention can be seen as being composed of a computer, such as an IBM-PC ™, -XT ™, -AT ™ or the like which includes a central processing unit (CPU), a film printer which includes a cathode ray tube (CRT), such as a Polaroid ® computer image recorder sold under the designation "Palette", and modified to accept RGB input in the case it is to be used for carrying out colored photography and a photographic exposure adaptor (PXA) which may be composed of circuit components mounted on a circuit board dimensioned and configured so that it may be fit into a full-length expansion slot in an IBM computer or the like. The PXA includes, in accordance with the present invention, a system interface provided to effect communication between the CPU bus and other components of the photographic exposure adaptor. A six bit data latch, which is under program control by the CPU, is provided as a page register (Page Register). A cathode ray tube controller (CRTC) is operatively arranged to provide address, vertical synchronization (VSYNC) and horizontal synchronization (HSYNC) signals when an image is being displayed on the CRT in the film printer. A synchronization delay (SYNC delay) is provided for delaying the VSYNC signal to achieve fine control over the vertical position of the image on the CRT of the image recorder. A display random access memory array (DRAM Array) is operatively arranged to be filled with pixel data under control of the CPU. When an image is to be photographed, control of the DRAM Array is given to the CRTC. A DRAM multiplexer (DRAM MUX) is provided to select addressing lines to the DRAM Array. A display random access memory data buffer (DRAM Data Buffer) is provided to enable output from the DRAM Array to be placed on the internal data bus of the PXA. An exposure mapping table (EMT) constituted by a 256×4 bit memory is operatively arranged to be accessed by either the CPU or the CRTC. An EMT address multiplexer (EMT Addr MUX) supplies addresses from either output from the DRAM Array or from an internal address bus on which appears output from the system interface. A bidirectional exposure mapping table data buffer (EMT Data Buffer) allows locations in the EMT to be read by the CPU. Output from the EMT is fed to a pixel shift register (Pixel Shift Register) which generates video data The video data is fed to video drivers, which also receive HSYNC and VSYNC signals from the CRTC via the HSYNC delay. The video drivers provide VSYNC, HSYNC and video signals to the film printer, an image recorder as noted above.

BRIEF DESCRIPTION OF THE DRAWINGS

The novel features that are considered characteristic of the invention are set forth with particularity in the appended claims. The invention itself, however, both as to its organization and its method of operation, together with other objects and advantages thereof is to be understood from the following description of illustrative embodiments, when read in conjunction with the accompanying drawings wherein:

FIG. 7 is an exemplary exposure time lookup table which is to be used in practicing the methods respectively illustrated in FIGS. 4, 5A, 5B, and 6A, 6B.

DETAILED DESCRIPTION OF THE PREFERRED EMBODIMENTS

Figure 1:
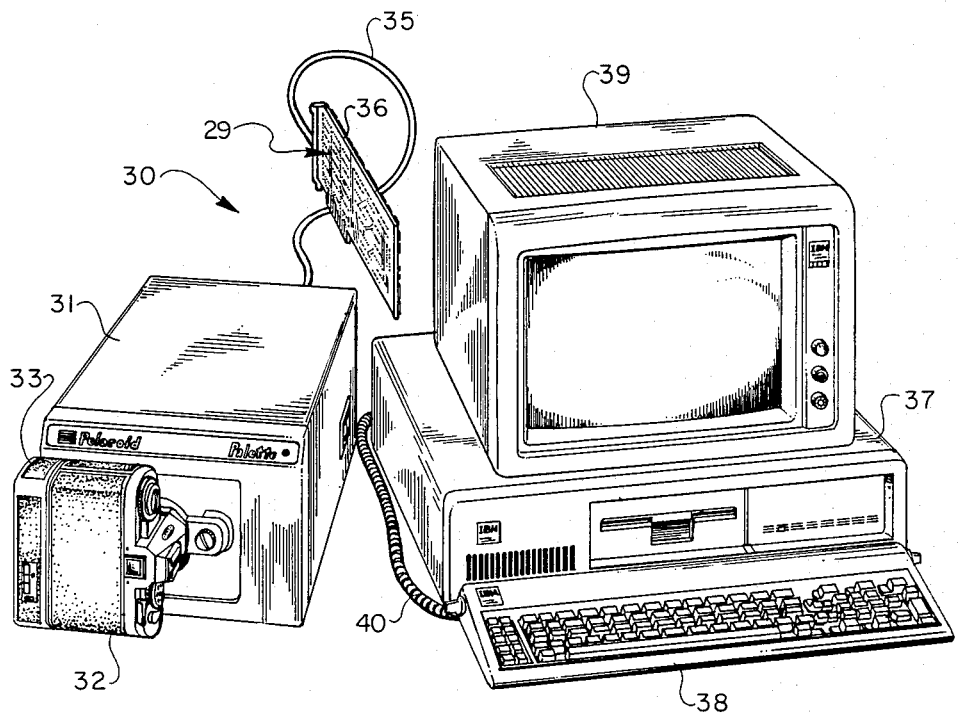
FIG. 1 is a pictorial representation of a realized system for defining and photographing color computer graphic images showing the interconnection between a commercially available IBM-XT computer and a commercially available computer image recorder available from Polaroid Corporation under the name "Palette" but modified to accept RGB inputs which may be used in practicing the present invention.

As illustrated in FIG. 1, an exemplary, realized system for defining and photographing colored computer graphic images which can be used in practicing the present invention is designated generally by the numeral 30. A computer image recorder 31 which may be a modified computer image recorder, such as a film printer sold under the name "Palette" by Polaroid Corporation, is provided with a conventional camera back 32. If desired, an automatic film advance driver 33 is coupled to the camera back 32 for remote camera control. A multilead cable 35 provides communication between the image recorder 31 and circuitry of a photographic exposure adaptor (PXA) which, as illustrated, is constituted by circuitry 29 on a circuit board 36. The circuit board 36, on which the circuitry 29 of the PXA is fixed, is so dimensioned and so shaped that it is positionable in a conventional full length expansion slot of a computer 37, shown for purpose of illustration as an IBM-XT computer, the board being broken away from the computer for purpose of illustration. A conventional keyboard 38 and color monitor 39 are provided, the keyboard being connected to the computer 37 by a conventional flexible cable 40. The keyboard 38, the color monitor 39 and the flexible cable 40, as illustrated, are commercially available units which may be obtained from the International Business Machines Corporation.

Figure 2:
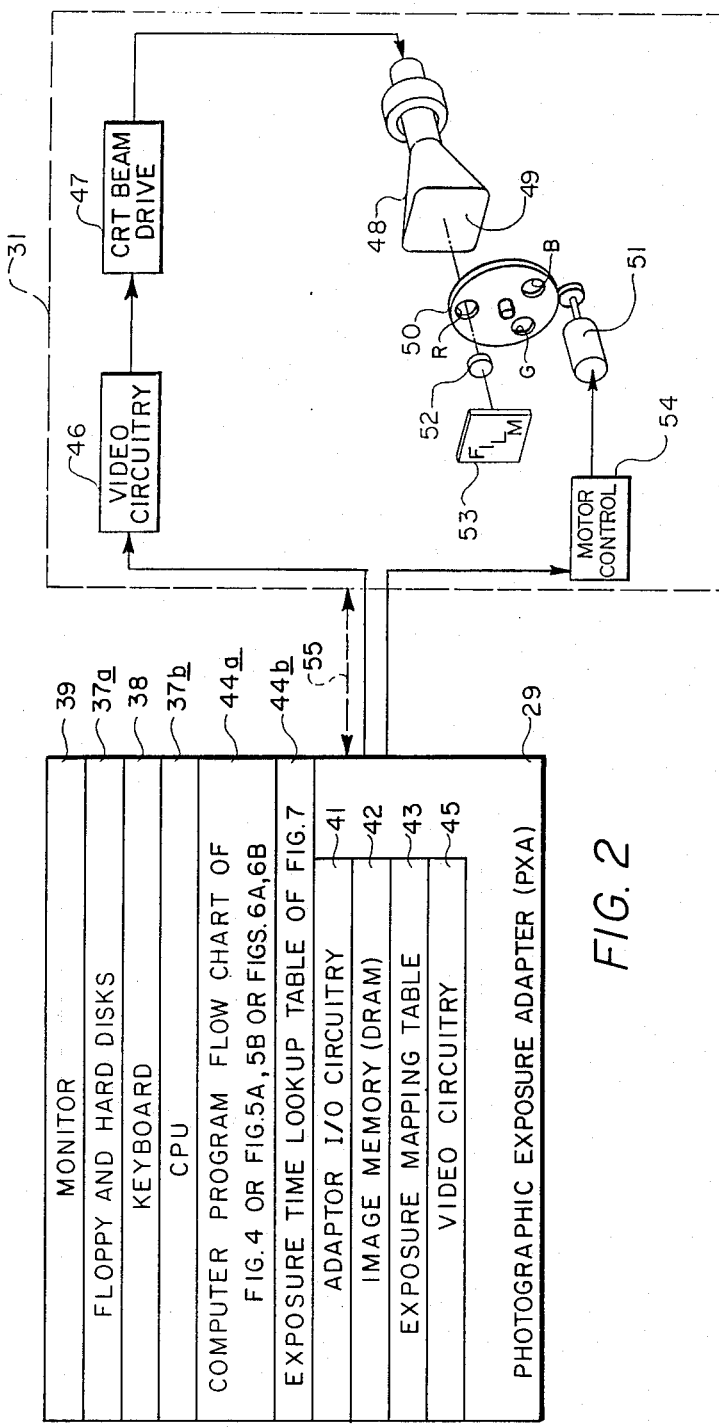
FIG. 2 is a block diagram of an exemplary preferred embodiment of a system for defining and photographing colored computer graphic images in accordance with the present invention.

The exemplary system for defining and photographing color computer graphic images, shown pictorially in FIG. 1, is illustrated diagrammatically in FIG. 2, the image recorder 31 being set out as a dashed-line block. The computer 37 (FIG. 1) is shown diagrammatically in FIG. 2 as being comprised of floppy and hard disks 37a and a central processing unit (CPU) 37b, the computer being capable of supporting software, and being operatively associated with the keyboard 38 and the monitor 39. The computer includes additionally in accordance with the present invention, photographic exposure adaptor (PXA) circuitry 29 which is preferably mounted on the circuit board (FIG. 1). The PXA circuitry 29 includes input/output (I/O) circuitry 42, an image display random access memory (DRAM) 42 which may be constituted by a DRAM Array 42, an exposure mapping table (EMT) 43 and video circuitry 45. Computer software illustrated diagrammatically as computer program flowcharts 44a and exposure time lookup table 44b is supported by the CPU 37b. A more detailed block diagram of the circuitry consisting of the PXA circuitry 29 of FIG. 2 is illustrated in FIG. 3, which is to be discussed in detail hereinbelow.

The computer is interfaced with the image recorder 31 via the PXA circuitry 29 which, as illustrated, feeds video signals, including synchronization signals, to video circuitry 46 within the image recorder 31, this circuitry, in turn, providing output signals to a cathode ray tube (CRT) beam drive 47. The output from the CRT beam drive 47 is directed to a black-and-white cathode ray tube 48 having a display screen 49 overlapped by a rotatably mounted filter wheel 50. The filter wheel 50 carries respective primary red (R), green (G), and blue (B) light filters, each one of which is positioned and arranged to be selectively moved into overlying relationship with respect to the display screen 49 by an electric motor drive 51. The light from the display screen 49 is transmitted in timed sequence through selective ones of the red, green and blue filters on the filter wheel 50 to a lens 52 from which it is imaged on the surface of a photosensitive material, shown as film 53. The film 53 is in fact contained within the camera back 32 (FIG. 1). As will be readily understood, the CRT 48, the filter wheel 50, the lens 52, and the film photosensitive material are all housed in a suitable lighttight chamber (not shown in the drawing). The motor drive 51, in turn, is controlled by a motor control 54, which receives output control signals from filter wheel control circuitry on the PXA circuitry 29 on the circuit board 36. Information signals are exchanged between the computer and the image recorder 31 via the PXA circuitry 29 on the circuit board 36, these signals providing information as to current conditions (on or off) of the CRT 48, current position of the filter wheel 50, signal conditions on the PXA and the like. The capacity to exchange these information signals is indicated diagrammatically by a dashed line 55.

It is to be understood that the interconnections provided by the connections illustrated by the dashed line 55 and the output to the motor control 54 could be provided directly from the CPU 37b. In some cases, the computer and the image recorder 31 could be advantageously housed within a single housing.

Figure 3:
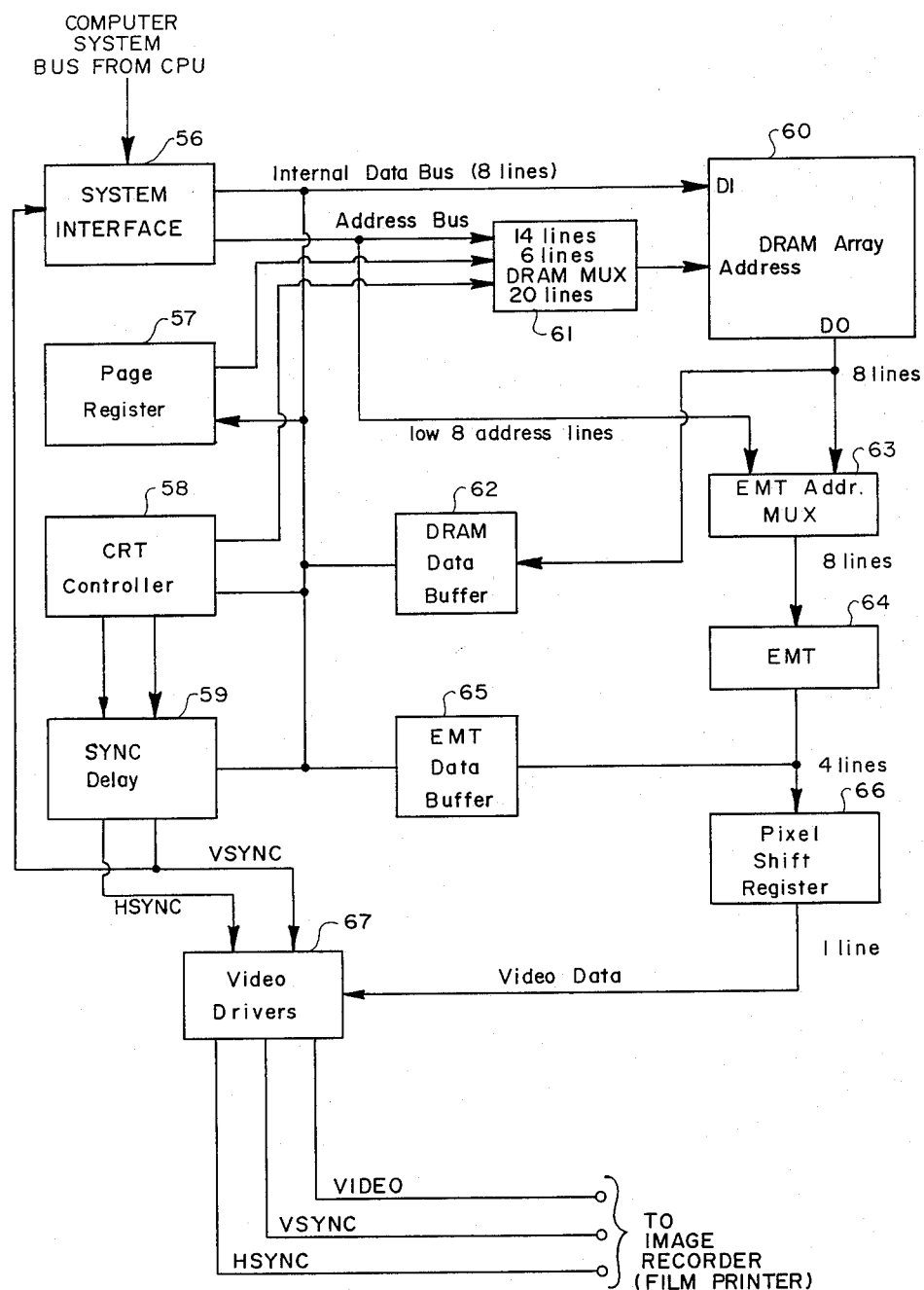
FIG. 3 is a simplified, block diagram of circuitry constituting a photographic exposure adaptor (PXA) which can be used in the system illustrated in FIGS. 1 and 2.

The PXA circuitry 29 on the circuit board 36 (FIGS. 1, 2) is illustrated in considerable detail in FIG. 3 as a simplified block diagram, showing the interconnection of the major components of the PXA circuitry 29. Timing control signals nd buses for such signals are not illustrated in order to keep the diagram as simple as possible, the timing and operating sequence being clear from the flowcharts shown in FIGS. 4, 5A, 5B and 6A, 6B and discussed in detail hereinbelow.

As illustrated in FIG. 3, the preferred PXA circuitry includes, in accordance with the present invention, a system interface 56 which contains buffers between the computer system bus from the CPU and internal data and address bus constituted by eight lines. It also contains circuitry for decoding I/O and memory read/write requests from the CPU. The system interface 56 is coupled to the data input (DI) of a display random access memory array (DRAM Array) 60 via the eight-line internal data bus. The system interface 56 is similarly coupled to a page register (Page Register) 57, a cathode ray tube controller (CRTC) 58 and a synchronization delay (SYNC Delay) circuit 59. The vertical synchronizing signal generated by the CRTC 58 is delayed in the VSYNC delay circuit 59 by a programmed amount of time in order to have a fine control over the vertical position of the image on the CRT of the image recorder.

The Page Register 57 is a six bit data latch which can be set under program control by the CPU. The output of this latch serves as the high-six address bits to the DRAM Array 60 whenever the CPU performs a read or write to the DRAM Array, this being supplied via a twenty-line DRAM multiplexer (DRAM MUX) 61. The system interface 56 also supplies address signals to the address input of the DRAM Array 60, via an address bus and the DRAM MUX 61.

The CRTC 58 provides the address to the DRAM Array 60, via the DRAM MUX 61, and the vertical and horizontal synchronization signals VSYNC and HSYNC when an image is being displayed on the CRT of the image recorder. The CRTC circuitry 58 and 59 includes two LSI devices, a Motorola 6845 CRT controller chip 58 and an Intel 8254 timer 59. The 6845 CRT controller generates addresses for the DRAM Array to display an image, as well as horizontal and vertical synchronization signals. The 6845 CRT controller lacks some capability in defining fine times for the horizontal and vertical sync positions. The 8254 timer provides these capabilities, the horizontal and vertical synchronization signals being fed into the 8254 timer so that timing can be defined under program control. Before any exposures occur, both of these devices must be initialized. The HSYNC delay is programmed before an exposure begins and remains constant during an exposure. Outputs from the 8254 timer are fed to the video drives 67 and thence to the image recorder (31, FIG. 1). The VSYNC signal also drives an interrupt line in the system interface so that the CPU can determine when the video signal vertical blanking interval occurs.

The DRAM Array 60 is preferably a one megabyte array of memory. The CPU fills the DRAM Array 60 with pixel data of an image. After the image has been built by the CPU, control of the DRAM Array 60 is given to the CRTC 58 so that the image can be displayed. The DRAM Array 60 comprises, as noted, a display memory having preferably a one megabyte memory which contains the image being exposed. This memory is not organized in a manner where the CPU and the CRTC 58 can utilize it simultaneously. A control line selects which of these units has control ("ownership") of this memory at any particular time. Each byte in the memory corresponds to a low resolution pixel. Pixels in the DRAM Array 60 are displayed from the upper left corner of the display to the lower right corner. The first location of the display is programmable. The memory lines are interleaved in a manner which allows the CRTC 58 to access the entire DRAM Array 60. The memory is divided into 128 K-byte blocks. For a one-megabyte board, there are 8 blocks. From the perspective of the CPU, interleaved scan lines of pixels are placed in different ones of the eight blocks. Each location in the DRAM Array 60 contains an eight-bit value which refers to a location in an exposure mapping table (EMT) 64.

The DRAM MUX 61 selects the source of the addressing lines to the DRAM Array 60. When the CPU is reading or writing data to the DRAM Array 60, the lower 14 bits of addressing are selected from the internal address bus and the upper six bits of addressing are selected from the Page Register 57. When an image is being displayed, 20 bits of addressing are selected from the CRTC 58.

When the CPU reads data from the DRAM Array 60, a DRAM data buffer (DRAM Data Buffer) 62 will enable output from the DRAM Array to be placed onto the internal data bus.

Data output from the DRAM Array 60 is fed to the EMT 64 via an exposure mapping table address multiplexer (EMT Addr MUX) 63. The EMT Addr MUX 63 functions to provide addresses to the EMT 64 from a selected one of two sources. When the CPU is reading or writing the EMT 64, the low eight address lines of the Internal Address Bus are selected. When an image is being displayed, the output of the DRAM Array 60 is selected.

The EMT 64 is a 256-location by four-bit memory device which can be accessed by either the CPU or the CRTC 58. A control bit indicates which unit has ownership of the EMT 64. When the CPU has ownership, the display will be blanked. Typically, the CPU will take ownership of the EMT 64 during vertical retrace, update the contents of the memory, and give the ownership back to the CRTC 58. The actual horizontal resolution of the PXA circuitry illustrated in FIG. 3 is 2048 pixels in the 512 line mode or 2560 pixels in 640 line mode. Each location of the EMT 64 corresponds to four adjacent bits; the least significant bit is the first (left most) pixel, the most significant bit is the fourth (right most) pixel. When reading or writing to the EMT 64, the upper four-bits of the byte which is written are ignored.

An exposure mapping table data buffer (EMT Data Buffer) 65 is provided, this buffer being a bidirectional buffer and is enabled when the CPU reads or writes the EMT 64. This allows locations in the EMT 64 to be set or read by the CPU.

When an image is being displayed, the output of the EMT 64 is presented to a pixel shift register (Pixel Shift Register) 66 which serializes the EMT 64 data to generate video data, which is supplied to video drivers (Video Drivers) 67 which buffer the video signal, the VSYNC and the HSYNC signals, and outputs these signals to the CRT of the image recorder.

Architecture for Exposure Mapping Table

Figure 8A:
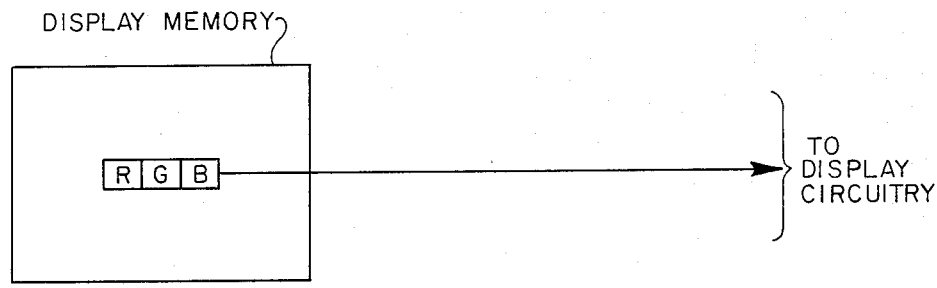
FIGS. 8A-8C are respectively diagrammatic showings of the use of direct color-mapping architecture, color-lookup table architecture and exposure mapping table architecture, FIG. 8C being particularly pertinent to the present invention.

The system and method under discussion is a combination of computer hardware and software, the latter being illustrated in the form of three computer program flowcharts of FIGS. 4, 5A, 5B and 6A, 6B, taken with the exposure time lookup table of FIG. 7. In carrying out the present invention, use is made of exposure mapping table architecture shown in FIG. 8C, which is to be compared with more conventional known approaches illustrated in FIGS. 8A and 8B which are discussed above.

Figure 8B:
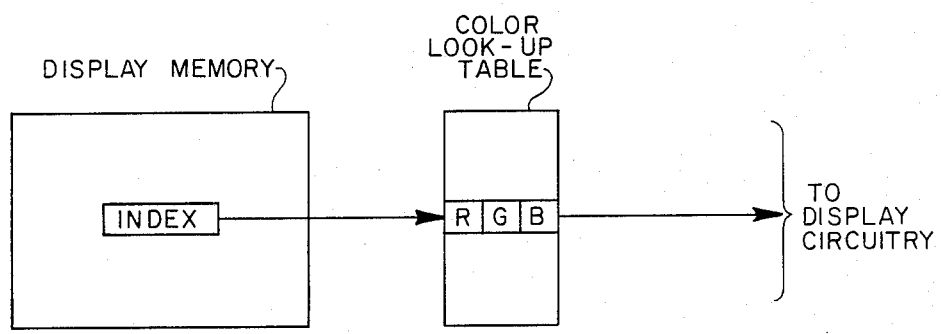
Figure 8C:
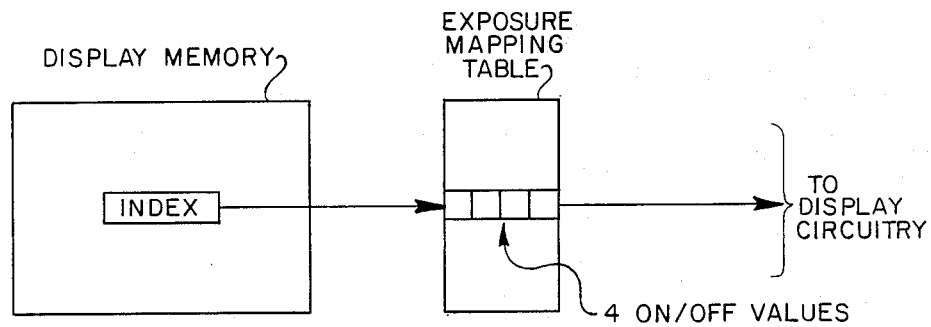

The novel exposure mapping table architecture for the photographic exposure adaptor of the present invention is illustrated in FIG. 8C. As can be seen this architecture is closely related to the color lookup table architecture (FIG. 8B). The main difference is that the color lookup table output (FIG. 8B) is the color of a given pixel; whereas, the exposure mapping table output (FIG. 8C) contains the "color" for up to four output pixels, in accordance with the present invention. Since the photographic exposure adaptor of the present invention drives the internal digital CRT of the film recorder, there are only two possible colors for each pixel, namely on or off. Hence only a single bit of output information is required to determine the state of the digital CRT for a given pixel. Thus the four output bits of the exposure mapping table may correspond to up to four pixels on the digital CRT.

The significance of the architecture of the exposure mapping table is that it allows for images of different horizontal resolutions by trading color level for line resolution. The basic algorithm can be considered as being implemented using the PXA as indicated hereinbelow, then modification of the algorithm to handle a higher resolution image is to be considered.

First suppose one wishes to expose an image having a resolution of 512×200. Suppose further that the input image has 256 levels of each primary color and that color separation has already been achieved. One then loads the red separation into the memory on the PXA circuit board with one byte (eight bits) corresponding to each pixel. One next initializes the exposure mapping table so that all entries are 0, that is off, rotates the red filter on the filter wheel into position, and turns on the internal screen of the CRT in the film recorder. Since all of the exposure mapping table entries are 0 no image appears on the CRT of the film recorder which is connected to the PXA. One then turns on level 255 of the image by turning on all four bits in entry 255 of the exposure mapping table, using a counter to keep track of how long this level gets exposed. The counter keeps track of the number of frames of exposure by counting occurrences of the VSYNC signal. When the correct amount of time is reached, all four bits in entry 254 of the exposure mapping table are turned on. Now both levels 255 and 254 are being exposed. Again, a counter is used to keep track of the exposure time. One continues in this manner until all 255 non-zero exposure levels have been completed. The same process is done for the green and blue color separations. Note that this implementation is efficient because once a color separation is loaded into the PXA memory, the display memory does not have to be accessed further. Only the exposure mapping table has to be periodically updated. This algorithm can be implemented in a traditional colormap architecture because conceptually all four bits in the exposure mapping table correspond to a single pixel in the image.

Now suppose that one wishes to expose an image with resolution of 1024×200, i.e. this image has twice as many pixels horizontally as in the previous example. Suppose also that one has only 16 levels of each primary color instead of 256. As in the previous case, one loads the red separation into the PXA memory, only this time one packs the pixel information so that each byte in the PXA memory corresponds to two pixels. The left (resp. right) four bits of the byte will correspond to the left (resp. right) pixel of each pair. Note here that one is using the assumption that there are only 16 levels of each primary color because this means that four bits are sufficient to express the 16 distinct levels. Again one initializes the exposure mapping table to all 0's and turns on the CRT of the film recorder. At this point one wants to turn on all pixels in the image that have red level 15. One uses the notation (x,y) to represent the packed pixel information in the PXA memory where x and y are numbers between 0 and 15. For example, consider that (5,12) represents a pixel pair where the left pixel has red level 5 and the right pixel red level 12. Note that the actual value stored in the PXA memory for such a pair is 92=16*5+12, and in general the value stored in memory for the pixel pair (x,y) is 16*x+y. Thus exposure mapping entry number 16*x+y corresponds to the pixel pair (x,y). It should now be clear that to turn on all pixels that have red level 15 one needs to turn on the left pixel for all exposure mapping entries of the form 16*15+y, and the right pixel for all exposure entries of the form 16*x+15. Recalling from FIG. 8C that the exposure mapping output consists of four bits corresponding to four on/off decisions, in the previous example, all four bits corresponded to a single pixel. In this example one lets the left two bits correspond to the left pixel of a pair, and the right two bits correspond to the right pixel of a pair. Thus one sets all color table entries of the form 16*15+y to (1,1,0,0) i.e. left pixel on, and all color table entries of the form 16*x+15 to (0,0,1,1), i.e. right pixel on. [Entry 16*15+15 is set to (1,1,1,1), i.e. both pixels on.] After waiting the appropriate exposure time, one has to turn on all pixels with red level 14, and the process is completely analogous to the discussion of level 15. This process is repeated for levels down to 1 and thereafter for the green and blue separations.

The key comparison in the above examples is that one has traded color resolution, i.e. 16 levels versus 256 levels per primary color for spatial resolution, i.e. 1024 pixels per line versus 512 pixels per line. Because implementation has four output bits per exposure mapping table, one can do one further such trade-off and get 2048 pixels per line with four levels per primary color. This trade-off is made possible by the exposure mapping table architecture (FIG. 8C).

Basic Photographic Exposure Flowchart

Figure 4:
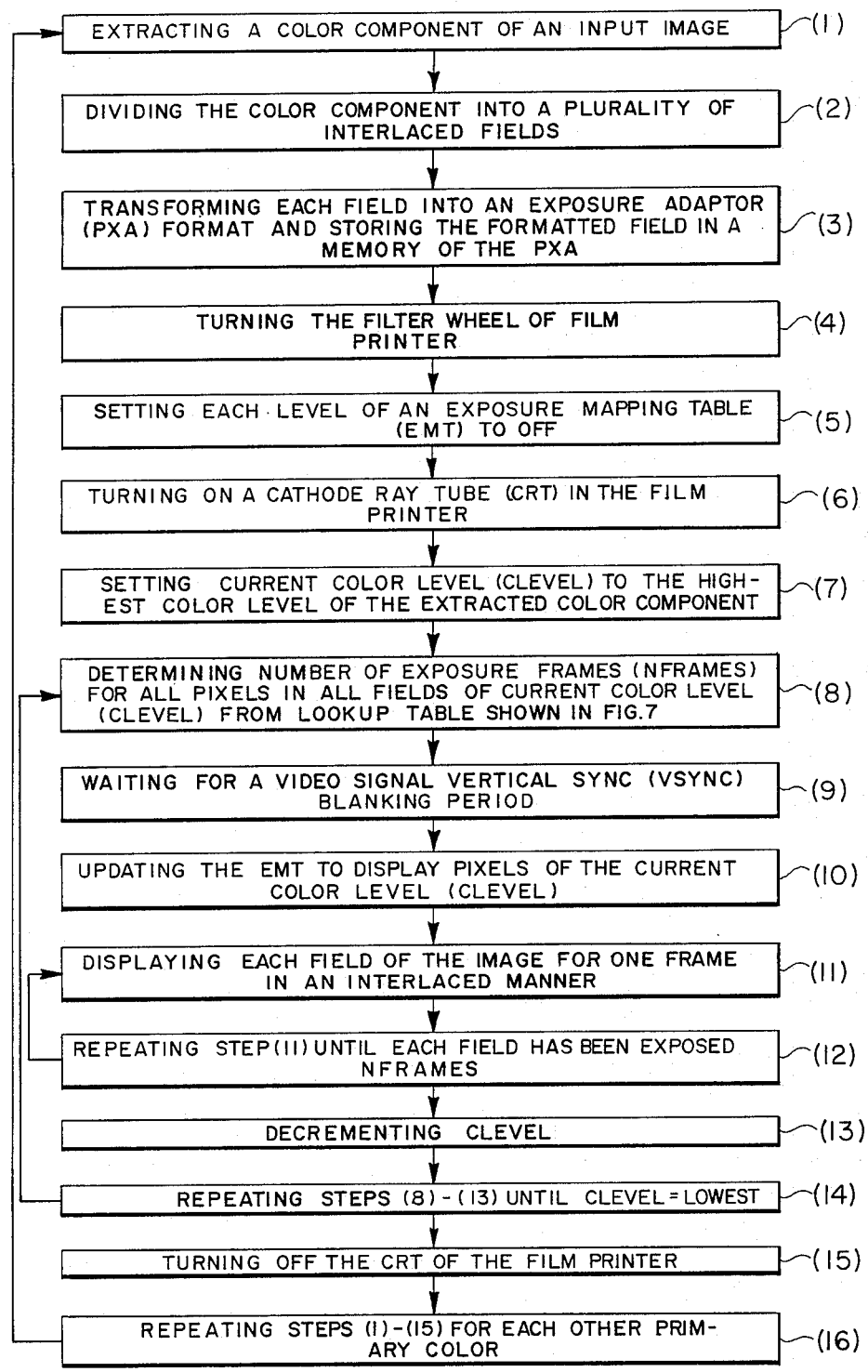
FIG. 4 is a block diagram of a first exemplary flowchart of a series of steps for defining and photographing a graphic image which are to be implemented in practicing the method of the present invention for trading image color resolution for spatial resolution using an exposure mapping table.

FIG. 4 constituting a block diagram of a flowchart, presents an overview of the method steps (including generic steps) performed by the system during the processing of a single input image, in accordance with the instant invention. One of the fundamental aspects of the system and method is capability to handle images of different resolutions. As discussed below the details of some of the generic steps depend on the resolution of the input image.

Step (1) begins with an input image and consists of extracting a color component of an input image. The spatial resolution of an image is generally expressed as the number of horizontal pixels by the number of vertical lines. Typical examples are 640×400 and 1024×800. Associated with each pixel in the image are red, green, and blue color levels. The color levels for each primary color generally range between zero and some maximum value with zero representing no color or black. Typical numbers for this maximum value are 31 or 255. A system with 32 color levels for each primary color is capable of representing 32,768 different colors (32×32×32 colors). In step (1) the color levels for each primary color are extracted. Conceptually, one has three separate images, one with the red levels for each pixel, one with the green levels and one with the blue levels. Steps (2)-(15) apply separately to each of these color component images.

Step (2) depends on both the vertical resolution of the input image and on the vertical resolution of the CRT in the film printer and consists of dividing the color component into a plurality of interlaced fields. The object of this step is to divide the input image into fields that can be displayed on the CRT. This step in conjunction with step (11) allows the system to handle images with different vertical resolutions. The simplest and most usual case occurs when the resolution of the input image is an exact multiple of the CRT resolution. For example, if the CRT has a resolution of 200 lines and the input image is 1024×800, then the input image can be divided into four fields (4=800/200), each of 200 lines. Furthermore, one wants these fields to be interlaced. In the 800 line example just considered, the first field would contain every fourth line of the input image beginning with line 1; the second field would contain every fourth line of the input image beginning with line 2; and so on up to the fourth field. In general, if there are N fields then the ith field contains every Nth line beginning with line i. It is also possible to divide the input image into fields even if the resolution of the image is not a multiple of the CRT resolution. For example, suppose the CRT resolution is 200 lines and the image vertical resolution is 700 lines. Noting that 1400 is the least common multiple of 200 and 700, one expands the input image to 1400 lines by interlacing blank lines between the given 700 lines of the image. Conceptually, one has a 1400 line image in which every other line is blank. This 1400 line image is now an even multiple of the CRT resolution and can be divided into seven fields as described above.

Step (3) depends on the horizontal resolution of the input image and consists of transforming each field into a format and storing the formatted field in a memory of the PXA. It is step (3) in conjunction with step (10) that allows the tradeoff between color resolution and spatial resolution. The object of this step is to transfer the fields of the input image into the PXA memory in a form that can be utilized by the EMT and the video circuitry of the PXA. A certain number of PXA memory locations correspond to a single line displayed on the internal CRT of the film printer. This number can be considered to be the PXA memory width. The exact value of the PXA memory width depends on the memory clocking frequency. In the preferred embodiment, each memory location consists of one byte and the memory width can be set to either 512 or 640 bytes of memory. Consider first the simplest case in which the horizontal resolution of the input image is equal to the selected memory width. In this case one location in the PXA memory corresponds to a single input pixel. The value stored in each memory location is simply the color level of the input image pixel corresponding to that location. Since each memory location is one byte, the input image color separation per pixel may contain up to 256 levels in this case.

A second case occurs when the horizontal resolution of the input image is twice that of the selected memory width. In this case each memory location corresponds to two input pixels. The memory location is divided into two equal parts. The color level for the left pixel of the pair is then stored in the high part of the memory location and the color level for the right pixel is then stored in the low part of the memory location. In the preferred embodiment one-half a byte of PXA memory corresponds to each pixel and thus only 16 color levels are available for each color separation. In the preferred embodiment the horizontal resolution of the image may also be four times the selected PXA memory width in which case only one-quarter byte of PXA memory corresponds to each input pixel. In general, if the EMT has width $2^{}N$ bits, then the horizontal resolution of the input image can be 1,2,4, ..., or $2^{}N$ times the selected PXA memory width. In the preferred embodiment the width of the EMT is 4 bits.

Step (4) consists of turning the filter wheel of the film printer. In step (4) the filter wheel is turned to the position corresponding to the color separation currently being processed.

Step (5) consists of setting each level of the EMT respectively either to OFF or ON. In step (5) all levels of the EMT are either set to OFF or ON, depending on whether one wishes to expose the constant color pixel groups in an ordered sequence ending up with all exposed or in an order sequence ending up only with the last of the color groups being exposed. The two possible sequences correspond to those disclosed in the Letters Patent '848 of d'Entremont et al., supra.

Step (6) involves turning ON the film printer internal CRT. Note that step (5) assures that the image displayed on the CRT is completely black at this point.

Step (7) consists of setting variable current color level (CLEVEL) to the highest color level of the extracted color component. In step (7) a counter that keeps track of the current color level is initialized to the highest color level.

Step (8) consists of determining the number of exposure frames (NFRAMES) for all pixels in all fields of CLEVEL. In step (8) a lookup table (FIG. 7) is accessed to determine the number of frames to expose the CLEVEL before turning on pixels of the next lower level. The value obtained depends on both the CLEVEL and the current color separation. Each field of the color separation is exposed for the determined number of frames. In the preferred embodiment it takes 1/60th of a second to display each frame so that this number represents a number of 60ths of a second of exposure.

Step (9) consists of waiting for a video signal vertical synchronization (VSYNC) blanking period. In step (9) the system waits for the video signal vertical blanking interval. During this interval the film printer CRT is blank and any changes to the EMT will not take effect until the beginning of the next frame. In the preferred embodiment the VSYNC signal triggers a hardware interrupt to indicate the start of the vertical blanking period.

Step (10) consists of updating the EMT respectively either to display or turn off pixels of the CLEVEL. Step (10) depends on the horizontal resolution of the input image, and the only difficulty is determining how to turn on every pixel of the CLEVEL. The simplest case occurs when the horizontal resolution is equal to the selected PXA memory width. In this case every memory location corresponding to a pixel with color level CLEVEL will simply contain the number CLEVEL. Thus updating the EMT (the architecture of which is illustrated in FIG. 8C and discussed hereinabove) in this case simply means changing all the bits in location CLEVEL of the EMT from OFF to ON. A more complicated case occurs when the input image horizontal resolution is twice the selected PXA memory width. In this case one has to modify multiple EMT locations. Denote by (x,y) the number obtained by storing the value x in the upper half and y in the lower half of a PXA memory location. (As described herein above the upper half of a PXA memory location corresponds to the left pixel of a pair, and the lower half to the right pixel of a pair.) Recall that for each such number of the form (x,y) there is a corresponding entry in the EMT. The left half of each EMT entry corresponding to a number of the form (CLEVEL,x), where x is arbitrary, has to be turned ON. In the preferred embodiment in which the EMT is four bits wide, this means that the left two bits of entries of the form (CLEVEL,x) have to be turned ON. Similarly, the right half of each EMT entry corresponding to a number of the form (x,CLEVEL) has to be turned ON. All other entries in the EMT remain unchanged. Note that the term left-most bits corresponds to those bits of the EMT that are clocked first to the video output circuitry. Similarly, the right-most bits are clocked last to the video output circuitry. The case in which the horizontal resolution of the input image is more than twice the selected PXA memory width is handled similarly.

Step (11) involves displaying each field of the image for one frame in an interlaced manner. In step (11) each field of the image is displayed for one frame. In the preferred embodiment a frame lasts 1/60th of a second. A hardware interrupt signal to the CPU indicates the beginning of the video signal vertical blanking period. During the video signal vertical blanking period, the portion of PXA memory selected for display on the CRT of the film printer is switched from one field to the next. The PXA video circuitry is capable of generating fine control of the vertical interlace factor. More details are provided below.

Step (12) consists of repeating step (11) until each field has been exposed NFRAMES. Step (12) indicates that step (11) is repeated until each field has had the required amount of exposure.

Step (13) consists respectively of either decrementing or incrementing CLEVEL in accordance with the setting of step (7). In step (13) the CLEVEL counter is decremented indicating that exposure for the color level is complete.

Step (14) consists of repeating steps (8)–(13) until CLEVEL equals zero. When CLEVEL counts down to zero, step (14) determines that the current color separation exposure is complete.

Step (15) involves turning off the CRT of the film printer. In step (15) the film printer CRT is turned off to terminate the exposure process for one color separation.

Step (16) involves repeating steps (1)–(15) for each other primary color. As indicated in step (16), the process defined by steps (1)–(15) is repeated for each color separation.

It is to be appreciated that in accordance with a salient feature of the present invention, the step (2) of dividing the color component into a plurality of interlaced fields in conjunction with the step (11) of displaying each field of the image for one frame in an interlaced matter allows the system to handle images having different vertical resolutions.

It is also to be understood that another salient feature of the present invention can be seen in the conjunction of the step (3) and the step (10). In this case, tradeoff between color resolution and spatial resolution is achieved in the method by the step (3) of transforming each field into PXA format and storing the formatted field in a memory of the PXA, and the step (10) of updating the EMT to display pixels of the CLEVEL.

In modified form, the method illustrated in FIG. 4 may be used in black and white and in single color graphic photography. In essence, the modified method involves, in essence, eliminating the color separating related steps (or making only one color separation) and the elimination of the repeating steps during which each primary color is separately exposed.

Generating Multifield Images

CRT graphics devices have used a technique, well known in the art, for increasing the vertical resolution of a display with an "interlaced" image. When an image is interlaced in accordance with the known technique, two fields are required to display the entire image. The first field displays all of the even scan lines and the second field displays all of the odd scan lines. Consequently, two vertical scans are required to display the entire image. When a CRT device is used to expose images on film, the image "flicker", which is related to the persistence of the phosphor of the CRT, is not a design criteria and it is desirable to be able to increase the vertical resolution by interlacing any number of fields. It is also desirable to dictate the number of fields in the image under software control.

Current graphics control devices do not provide the ability to specify more than two fields in an image. (The image is not interlaced or is interlaced with two fields.) External circuitry on the PXA board in accordance with the present invention provides a means for modifying the vertical synchronization pulse from the CRT controller device in order to interlace any number of fields.

To generate a stable image on a CRT device, a stable vertical synchronization frequency is required. Consider the case where each field of an image is composed of 200 scan lines and the total vertical rate is the equivalent of 262 scan lines (this is the timing specified by the NTSC standard for television). When two fields are used to provide an effective vertical resolution of 400 lines (fields at 200 lines each), the vertical synchronization frequency, which must be constant, is set to $262\frac{1}{2}$ scan lines.

The CRT controller device on the PXA circuit board is not able to delay the vertical synchronization pulses for an arbitrary fraction of the horizontal scan. It does, however, provide the capability to program the total vertical rate in equivalent scan lines. Circuitry has been added to delay the vertical synchronization signal which is generated by the CRTC. The delay time is programmable. In order to generate a vertical synchronization signal which will display N interlaced fields, both the CRTC and the delay circuit are reprogrammed during every vertical synchronization blanking period.

To display N interlaced fields, the vertical scan rate must be the equivalent of 262 1/N horizontal scan lines. During each vertical synchronization blanking period, an algorithm is used to modify the total vertical rate (VTOTAL) and the vertical synchronization delay time (VSDELAY) of the CRTC. An initial condition is that the field number (FLDNUM) is zero, N being the number of fields in the image. The algorithm is as follows: Is FLDNUM equal to (N−1)? If the answer is YES, then set FLDNUM to 0, set VSDELAY to 0 and set VTOTAL to 263. If the answer is NO, increment FLDNUM, VSDELAY equaling [(FLDNUM+1)-*horizontal scan line time]/N and VTOTAL equaling 262.

As an example, for a four field image, the values of VSDELAY and VTOTAL on successive vertical synchronization blanking intervals would be:

| FLDUM | VSDELAY | VTOTAL |
|---|---|---|
| 0 | ¼ of horz scan time | 262 |
| 1 | 2/4 of horz scan time | 262 |
| 2 | ¾ of horz scan time | 262 |
| 3 | 0 | 263 |
| 0 | ¼ of horz scan time | 262 |
| 1 | 2/4 of horz scan time | 262. |

The difference in the vertical scan total is always 262 ¼ lines.

Color-mapped Variation of Basic Responsive Flowchart

The previous discussion of FIG. 4 addressed the most straight forward method for exposing an RGB input image in which associated with each pixel are red, green, and blue color levels. In this section a first variation of EMT usage is discussed.

The first variation in the use of the EMT is illustrated by the exposure method for a medium resolution color mapped image. In such an image, each pixel value is an index into a color table. Each entry in the color table contains an RGB value which indicates the color level for each primary color. This representation allows a greater palette of possible colors for a given size of the pixel map. For example consider an input image where each pixel is represented with one byte. In such an image each pixel can take on one out of 256 possible values and the corresponding color map will have 256 entries. Each of these entries might be one byte wide for each primary color allowing 56 levels for each primary color. More than 16 million colors are possible in such an architecture, although only 256 of these colors can be displayed in a single image.

The exposure method for a color mapped image differs in two ways from the RGB exposure method illustrated on FIG. 4. First, it is not necessary to perform a color separation of the input image. One simply copies the input image to the PXA memory. To do this one needs an input image in which the index value associated with a pixel will fit into the PXA memory associated with that pixel. In the preferred embodiment this means that one pixel of the input image corresponds to one PXA memory location. The second difference concerns the way the EMT is updated in step (10) of FIG. 4 to display all pixels with current color level (CLEVEL) of a given primary color. Recall that each pixel value is an index into a color map, and that the color map entry contains the color level for the given primary color. Thus one searches through the indices of the color map to locate every entry whose color level for the given primary is equal to CLEVEL. The EMT entry corresponding to each such index is turned ON. Note that many entries of the EMT may have to be turned on in order to display all pixels with the given primary color level equal to CLEVEL. To do this in a timely manner, the software needs to create a local copy of the updated EMT while waiting for the vertical blanking interval. When the vertical blanking interval occurs, the local copy of the EMT is copied to the EMT on the PXA. The rest of the exposure method continues as described previously.

Multiple Pass Exposing Flowchart

Figure 5A:
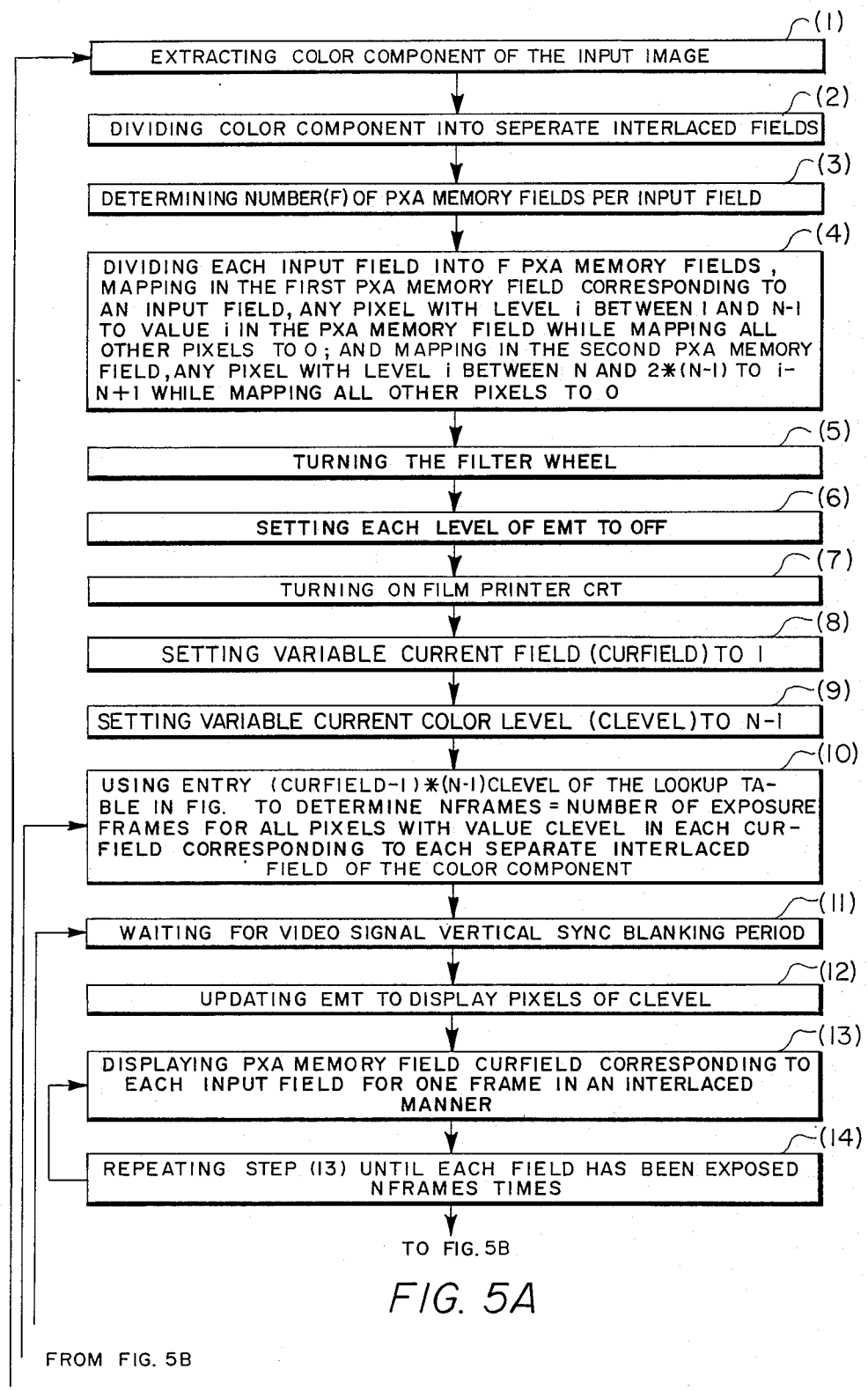
FIGS. 5A and 5B taken together constitutes a block diagram of a second exemplary flowchart for a series of steps for defining and photographing a graphic image which are to be implemented in practicing the method of the present invention through the use of an exposure mapping table and in which input fields are split into a plurality of PXA memory fields.
Figure 5B:
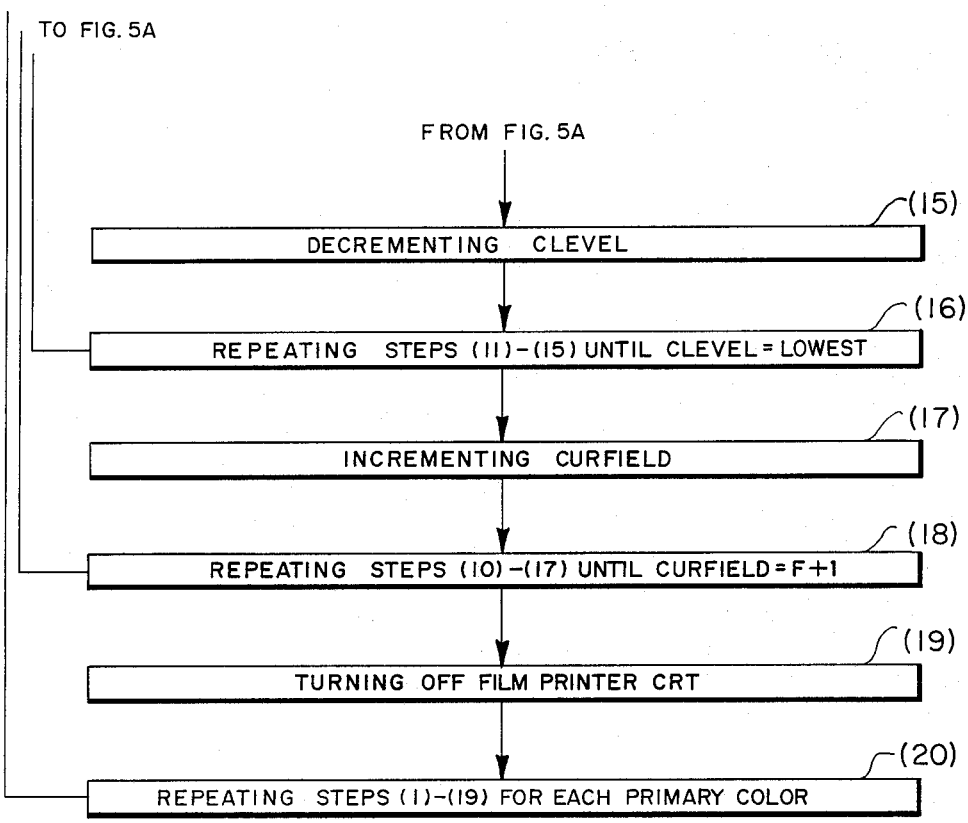

The flowchart set out in FIGS. 5A and 5B applies principally to the situation in which the number of desired color levels per pixel will not fit into the PXA memory allocated for each pixel in a field. For purposes of illustration assume that the horizontal resolution of the input image is twice that of the selected PXA memory width. In the preferred embodiment this means that in each PXA field, one-half a byte is allocated per pixel so that 16 different values can be stored per pixel in each field. In the basic exposing flowchart (FIG. 4), each color component would be restricted to 16 color levels. Assume in this case that the input image has 31 levels instead of 16. The technique described in the flowchart set out in FIGS. 5A and 5B involves splitting each input field into two PXA memory fields as described below.

Steps (1) and (2) are the same as in the basic photographic exposing flowchart (FIG. 4).

Step (3) involves determining the number F of PXA memory fields per input field. Step (3) is carried out as by letting L equal the number of color levels in the color component, letting N equal the number of levels expressible per pixel in the PXA memory and F equals $(L-1)/(N-1)$; and if $(L-1)/(N-1)$ is not an integer, round F up to the next highest number. Step (3) determines how many PXA memory fields will correspond to each input color component field. Assume for this discussion that L=31 and in the preferred embodiment N=16. Hence the number of PXA memory fields per input field is given by F=30/15=2. This means that for each input field it will take two fields in the PXA memory to express all 31 color levels.

Step (4) involves dividing each input field into F PXA memory fields. Step (4) determines how each input color separation field is split into PXA memory fields. In the example under consideration there are two PXA memory fields for each input field. Any pixel in the input field with color level i between 1 and 15 is mapped to value i in the first PXA memory field. Pixels with color value 0 or color value 16 to 30 are all mapped to value 0 in the first PXA memory field. Thus the first PXA memory field contains the low color levels of the input field. In the second PXA memory field all input pixels with color value i between 16 and 30 are mapped to value i-15. Note that the value i-15 will be between 1 and 15 and hence will fit in the PXA memory associated with a single pixel. All pixels with color level between 0 and 15 are mapped to value 0. Thus the second PXA memory field contains the high color levels of the input field. In general in the jth PXA memory field, and pixel with level i between (j−1)*(N−1)+1 and j*(N−1) is mapped to i−(j−1)*(N−1), while all other pixels are mapped to 0.

Steps (5) to (7) are the same as steps (4)-(6) in the basic photographic exposing flowchart (FIG. 4).

Step (8) involves setting current field (CURFIELD) to 1. In step (8) the variable CURFIELD is initialized to 1. When exposing the image one first works with PXA memory field 1 for each interlaced field in the color separation. A second pass is then required to expose PXA memory field 2 for each interlaced field. In the current example this means that all pixels with low color levels are exposed on the first pass while pixels with high color levels are exposed in the second pass.

Step (9) is the same as step (7) in the basic photographic exposing flowchart (FIG. 4).

Step (10) involves using entry (CURFIELD−1)*(N−1)+CLEVEL of lookup table in FIG. 7 to determine how many frames of exposure are required for pixels with value CLEVEL in the CURFIELD PXA memory field corresponding to each input field. This step is similar to step (8) in the basic photographic exposing flowchart (FIG. 4) except that it is necessary to factor in the current PXA memory field In the example in pass 1 when CURFIELD equals 1, NFRAMES will be set to the value in entry CLEVEL of the lookup table in FIG. 7 while on pass 2 when CURFIELD equals 2, NFRAMES will be set to the value in entry 15+CLEVEL.

Steps (11) to (16) are the same as steps (9) to (14) in the basic photographic exposing flowchart (FIG. 4) except that in this case one works with the CURFIELD PXA memory field corresponding to each input field.

Steps (17) and (18) indicate that steps (10) to (17) needed to be repeated for all PXA memory fields Steps (19) and (20) are the same as steps (15) and (16) in the basic photographic exposing flowchart (FIG. 4).

As in the method illustrated in FIG. 4, the method illustrated in FIGS. 5A, 5B can, in modified form, be used in single color and in black and white photography. In essence, the modified method involves essentially the elimination of the color separation related step (or making only one color separation) and eliminating the repeating of the steps during which each primary color is separately opposed.

Exposure Time Binary Expansion

As indicated above, the previous discussion addressed the most straight forward method for exposing an RGB input image in which image color resolution is traded for spatial resolution through use of an exposure mapping table. In this section, a second variation is discussed which allows image storage requirements to depend on maximum exposure time rather than the number of exposure levels. An algorithm is presented that minimizes the difficulties in the loss of color resolution for high spatial resolution images, in accordance with the third exemplary embodiment of the present invention, as illustrated in the flowchart set out in FIGS. 6A, 6B.

Consider first the example in which a 1024×200 image is to be printed on film. This image might be one field of a 1024×800 image. Suppose that each primary color has 32 levels instead of 16, and restrict one's attention to the red color separation. The obvious strategy for printing this image is to treat the image in multiple passes as discussed above. Note, however, that only fifteen (15) levels besides off can be exposed per pass so three passes are required. It should also be clear that the number of passes required will go up roughly linearly with the number of color levels. An increase in the number of levels leads to an exorbitant increase in passes and hence exposure times, a distinct shortcoming overcome by the embodiment illustrated in FIGS. 6A, 6B.

Figure 6A:
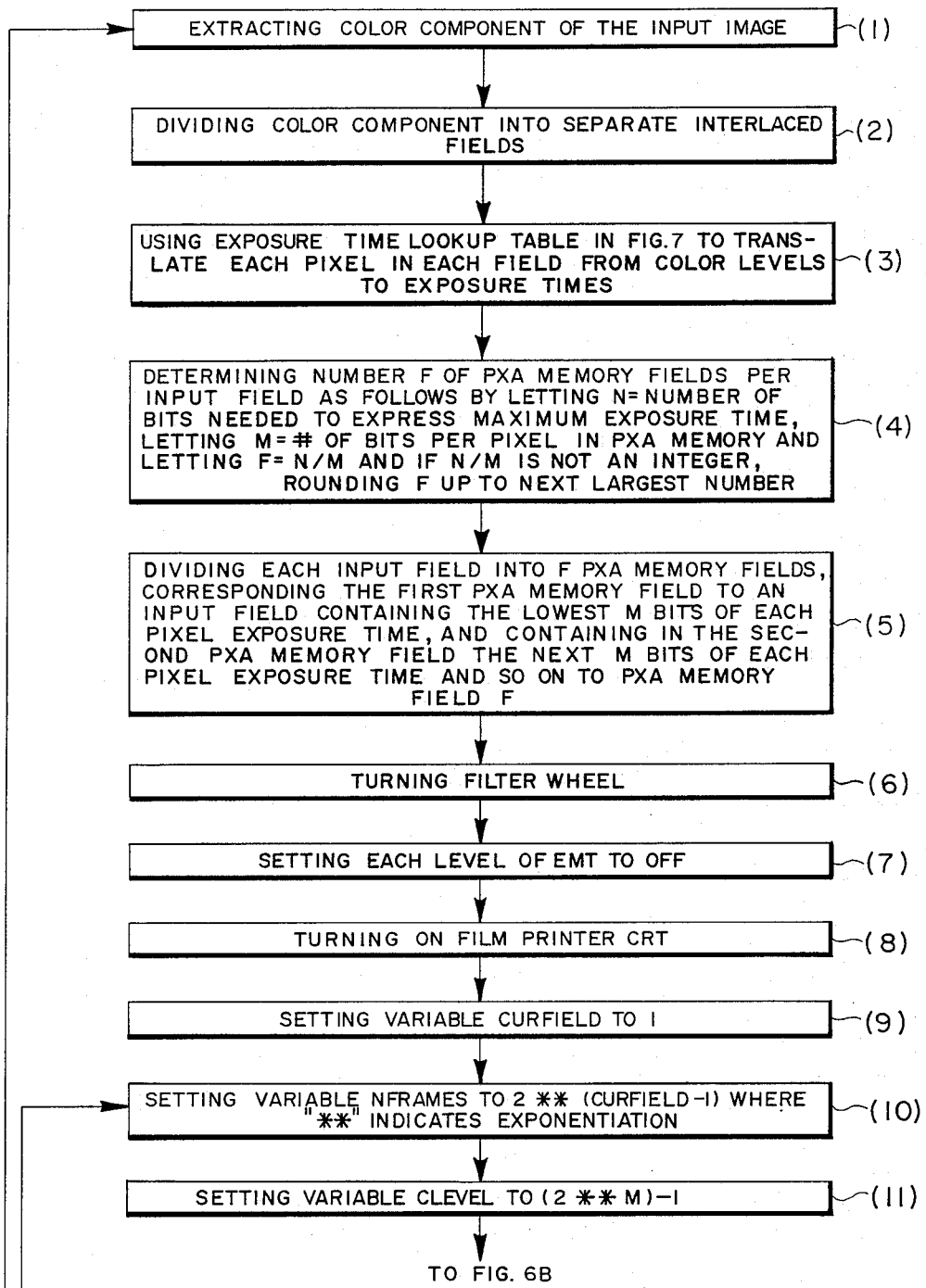
FIGS. 6A and 6B taken together constitutes a block diagram of a third exemplary flowchart for a series of steps for defining and photographing a graphic image which are to be implemented in practicing the method of the present invention through the use of an exposure mapping table and in which color levels are translated to exposure times.
Figure 6B:
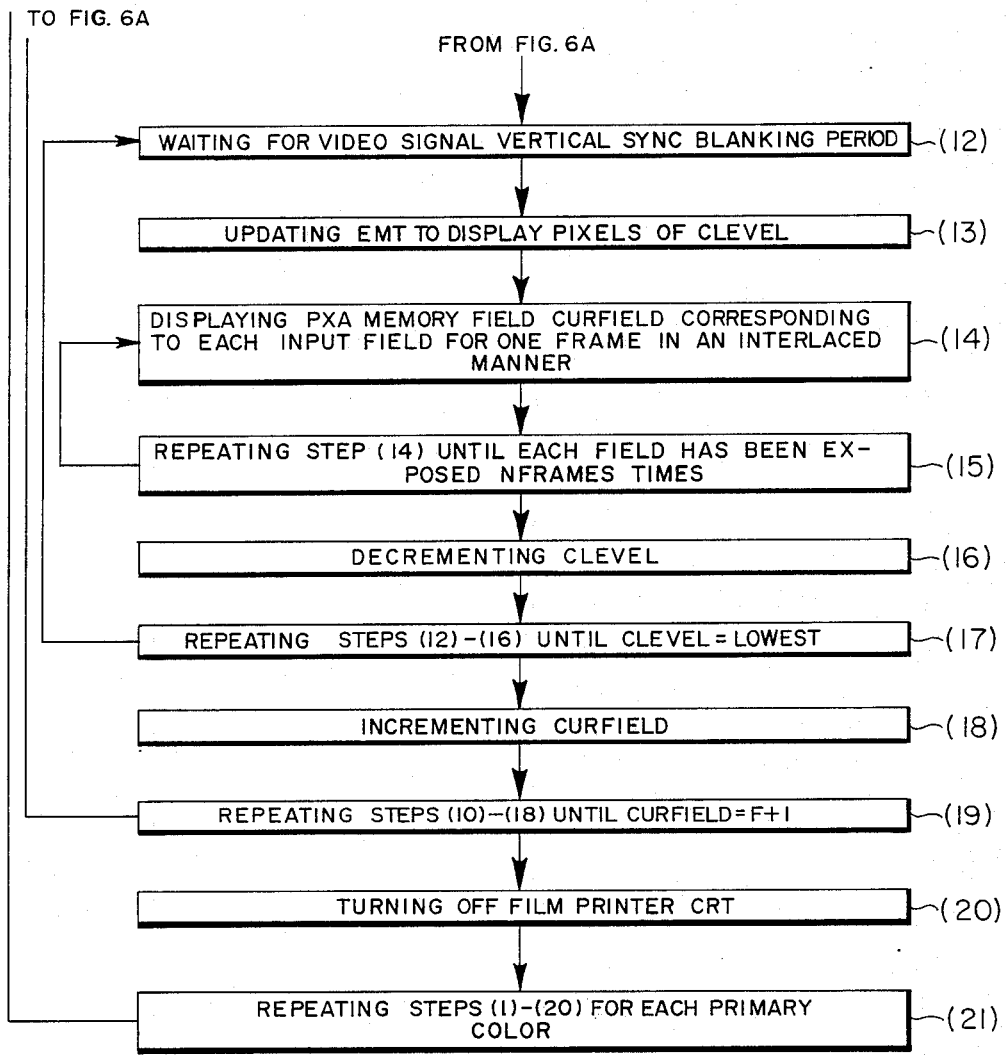

The novel approach to the problem discussed in the previous paragraph as illustrated in FIGS. 6A, 6B involves translating the color levels into exposure times. For convenience suppose that these exposure times are normalized to a scale between 0 and 255 so that the exposure time can be expressed in one byte of memory. Once again one processes the image in two passes. In the first pass one processes the lower four bits of the exposure time. These bits indicate how many exposure time units each pixel should be exposed in this pass. Thus, once level 15 pixels have been turned on one waits one time unit before turning on level 14 pixels. Similarly, one waits one more time unit before turning on level 13 pixels, and so on. The second pass is handled similarly except that one considers the upper four bits of the exposure time and now waits 16 time units before turning on the next level. It is easy to calculate that after two passes each pixel will have been exposed for the required number of time units.

As can be seen the flowchart of FIGS. 6A and 6B is similar to the multiple pass flowchart of FIGS. 5A and 5B. Again consider the case in which the horizontal resolution of the input image is twice the selected memory width Rather than assume that the input image has 31 levels, in this discussion assume that the maximum exposure time can be expressed in one PXA memory location. In the preferred embodiment this means that at most 255 frames of exposure are required for any color level. This again allows the exposure to take place in two passes. The flowchart of FIGS. 6A, 6B is written so that more than 255 exposure frames can be handled, but then additional exposure passes are required.

This novel approach consists essentially of a binary expansion of exposure times. The main advantage gained is that the number of color separations increases as the logarithm of the maximum exposure time and is independent of the number of color levels in the input image. The binary expansion algorithum allows the image storage requirements to depend on maximum exposure time rather than on the number of exposure levels. Thus high-color, high-spatial resolution images can be created in reasonable processing times by combining this binary exposure algorithm with the exposure mapping capability of the PXA as described above.

It is to be understood that the exposure time binary expansion method illustrated in FIGS. 6A, 6B can be used in single color and in black and white computer graphic photography in a modified form. In essence, the modified method simply involves eliminating the color separating related steps (or separating only one color) and eliminating the repeating of the steps which result in separate exposures for each primary color.

Software programs can readily be written for carrying out the methods illustrated in FIGS. 4, 5A, 5B and 6A, 6B. Assembly or C languages can be employed. Overlay software, as well as documentation therefor, is made available by Polaroid Corporation under the title "Professional Exposure Adaptor (PXA) Software Version 2.0".

A number of achievements may be realized in the application of the present invention in both its method and system aspects. Relatively short exposure times and different spatial resolutions are possible. Spatial resolution can be exchanged for color resolution and vice versa. Flexible control of the film recorder can be effected. Raster lines visible in the image are minimized. The video signal is controlled directly from the PXA, rather than from the computer display, allowing the film printer to be driven at a standard frequency of 15.75 kilohertz regardless of the computer graphics controller. The computer is free to perform other tasks during portions of the system operation.

The foregoing description of preferred embodiments and accompanying illustrations have been set out by way of example, not by way of limitation. Numerous other embodiments and many variants are possible without departing from the spirit and scope of the invention, its scope being defined in the appended claims.

What is claimed is:

1. An improvement in a system for computer graphic photography, the improvement comprising means including an exposure mapping table at each address containing on or off display information data for a plurality of adjacent multiple display pixels, and a display memory containing indices into said exposure mapping table, said exposure mapping table being coupled to said display memory and responsive to said indices for outputting said on or off display information.

2. The system according to claim 1, wherein said data for said plurality of adjacent display pixels contains up to four on or off values.

3. A method of colored computer graphic photography comprising (a) extracting a color component of an input image into at least one filed, (b) transforming the field into a format and storing the formatted field in a memory, (c) turning a filter wheel of a film printer, (d) setting each level of an exposure mapping table respectively to off or on in accordance with vertical resolution and color resolution of the image, (e) turning on a cathode ray tube in the film printer, (f) setting variable current color level respectively to the highest or lowest color level of the extracted color component, (g) determining number of exposure frames for all pixels in all fields of the current color level from a lookup table (FIG. 7) (h) waiting for a video signal vertical synchronization blanking period, (i) updating the exposure mapping table respectively to display or turn off pixels of the current color level, (j) displaying the field of the image for at least one frame, (k) respectively decrementing or incrementing the current color level in accordance with the setting of step (f), (l) repeating steps (g)–(k) until the current color level reaches respectively the lowest or highest color level, (m) turning off the cathode ray tube of the film printer, and (n) repeating steps (a)–(m) for each other primary color.

4. A method of colored computer graphic photography which allows tradeoff between color resolution and horizontal resolution, comprising the steps of (a) extracting a color component of an input image into at least one field, (b) transforming the field into a format and storing the formatted field in a memory, (c) setting each level of an exposure mapping table respectively to off or on in accordance with vertical resolution and color resolution of the image, (d) updating the exposure mapping table respectively to display or turn off pixels of current color level, and (e) repeating steps (a)–(d) for each other primary color.

5. A method of colored computer graphic photography comprising (1) extracting a color component of an input image; (2) dividing the color component into a plurality of separate interlaced fields; (3) determining number of memory fields per input field in accordance with vertical resolution and color resolution of the images; (4) dividing each input field into the determined number of memory fields, mapping any pixel with a level between 1 and N−1 in the first memory field while mapping all other pixels to 0, N being the number of distinct color levels expressible per pixel, and mapping any pixel with a level between N and 2*(n−1) to the level −N+1 in a second memory field while mapping all other pixels to 0; (5) turning a filter wheel in a firm printer; (6) setting each level of an exposure mapping table respectively to off or on; (7) turning on a cathode ray tube in a film printer; (8) setting variable current filed to 1; (9) setting variable current color level to N−1; (10) using entry of a lookup table (FIG. 7) to determine number of exposure frames for all pixels with the current color level in each current field memory corresponding to each separate interlaced field of color component; (11) waiting for a video signal vertical synchronization blanking period; (12) updating the exposure mapping table respectively to display or turn off pixels with the current color level; (13) displaying memory current field corresponding to each input field for one frame in an interlaced manner; (14) repeating step (13) until each field has been exposed for the determined number of exposure frames; (15) respectively decrementing or incrementing the current color level in accordance with the setting of step (6); (16) repeating steps (11)–(15) until the current color level reaches respectively the lowest or highest color level; (17) incrementing the current field; (18) repeating steps (10)–(17) until the current field equals the determined number of memory fields plus one; (19) turning off the cathode ray tube of the film printer; and (20) repeating steps (1)–(19) for each primary color.

6. A method of colored computer graphic photography comprising (a) extracting a color component of an input image into at least one field; (b) determining number of memory fields per unit field; (c) dividing the input field into the determined number of memory fields in accordance with vertical resolution and color resolution of the image, mapping any pixel with a level between 1 and N−1 in the first memory field while mapping all other pixels to 0, N being the number of distinct color levels expressible per pixel in memory, and mapping any pixel with a level between N and 2*(N−1) to the level −N+1 in a second memory field while mapping all other pixels to 0; (d) turning a filter wheel in a film printer; (e) setting each level of an exposure mapping table respectively to off or on; (f) turning on a cathode ray tube in the film printer; (g) setting variable current field to 1; (h) setting the variable current color level to N−1; (i) using entry of a lookup table (FIG. 7) to determine the number of exposure frames for all pixels with the current color level in each current field memory corresponding to the field of color component; (j) waiting for a video signal vertical synchronization blanking period; (k) updating the exposure mapping table respectively to display or turn off pixels with current color level; (l) displaying memory current field corresponding to the input field for one frame; (m)

repeating step (1) until the field has been exposed for the determined number of exposure frames; (n) respectively decrementing or incrementing the current color level in accordance with the setting of step (e); (o) repeating steps (j)–(n) until the current color level reaches respectively the lowest or highest color level; (p) incrementing the current field; (q) repeating steps (i)–(p) until the current field equals the predetermined memory fields plus one; (r) turning off the cathode ray tube in the film printer; and (s) repeating steps (a)–(r) for each primary color.

7. A method of colored computer graphic photography comprising (a) extracting a color component of an input image; (b) determining number of memory fields per unit field; (c) dividing each input field into the determined number of memory fields in accordance with vertical resolution and color resolution of the image, mapping any pixel with a level in one range in a first memory field of the predetermined number of memory fields while mapping all other pixels to 0 and mapping in respective others of the predetermined memory fields, any pixel with respective other ranges while mapping all other pixels to 0; (d) turning a filter wheel in a firm printer; (e) setting each level of an exposure mapping table to off; (f) turning on a cathode ray tube in the film printer; (g) respectively setting variable current field to 1 or the number of predetermined memory fields; (h) setting variable current color level to N−1; (i) using entry of a lookup table (FIG. 7) to determine the number of exposure frames for all pixels with the current color level in each current field memory corresponding to the field of color component; (j) waiting for a video signal vertical synchronization blanking period; (k) updating the exposure mapping table to display pixels with the current color level; (e) displaying memory current field corresponding to the input field for one frame; (m) repeating step (1) until the field has been exposed for the determined number of exposure frames; (n) decrementing the current color level; (o) repeating steps (j)–(n) until the current color level equals 0; (p) respectively incrementing or decrementing the current field; (q) repeating steps (i)–(p) until the current field respectively equals one more than the predetermined memory fields or zero; (r) turning off the cathode ray tube in the film printer; and (s) repeating steps (a)–(r) for each primary color.

8. A method of colored computer graphic photography comprising (1) extracting a color component of an input image, (2) dividing the color component into a plurality of separate interlaced fields in accordance with vertical resolution and color resolution of the image, (3) transforming each field into a format and storing the formatted fields in a memory, (4) turning a filter wheel of a film printer, (5) setting each level of an exposure mapping table respectively to off or on, (6) turning on a cathode ray tube in the film printer, (7) setting variable current color level respectively to the highest or lowest color level of the extracted color component, (8) determining number of exposure frames for all pixels in all fields of the current color level from a lookup table (FIG. 7), (9) waiting for a video signal vertical synchronization blanking period, (10) updating the exposure mapping table respectively to display or turn off pixels of the current color level, (11) displaying each field of the image for one frame in an interlaced manner, (12) repeating step (11) until each field has been exposed for the determined number of exposure frames, (13) respectively decrementing or incrementing the current color level in accordance with the setting of step (7), (14) repeating steps (8)–(13) until the current color level reaches respectively the lowest or highest color level, (15) turning off the cathode ray tube of the film printer, and (16) repeating steps (1)–(15) for each other primary color.

9. A method of colored computer graphic photography comprising (1) extracting a color component of the input image; (2) dividing the extracted color component into separate interlaced fields, the number of separate interlaced fields depending on the vertical resolution of the input image; (3) using an exposure time lookup table (FIG. 7) to translate each pixel in each field from color levels to exposure ties; (4) determining number of memory fields per unit field by letting N equal number of bits needed to express maximum exposure time, letting M equal the number of bits per pixel in memory and letting F equal N/M and if N/M is not an integer, rounding the number of fields up to the nest largest number; (5) dividing each input field into the determined number of memory fields, the first memory field corresponding to an input field and containing the lowest M bits in each pixel exposure time, the second memory field containing the next M bits of each pixel exposure time and so on to the highest memory field number; (6) turning a filter wheel in a film printer; (7) setting each level of an exposure mapping table respectively to off or on; (8) turning on a cathode ray tube in the film printer; (9) setting the variable current field to 1; (10) setting the variable number of exposure frames to 2(current field−1) where  indicates exponentiation; (11) setting the variable current color level to (2**M)−1; (12) waiting for a video signal vertical synchronization blanking period; (13) updating the exposure mapping table respectively to display or turn off pixels of current color level; (14) displaying the memory current field corresponding to each input field for one frame in an interlaced manner; (15) repeating step (14) until each field has been exposed for the set number of exposure frames; (16) respectively decrementing or incrementing the current color level in accordance with the setting of step (7); (17) repeating steps (12)–(16) until the current color level reaches respectively the lowest or highest color level; (18) incrementing the current field; (19) repeating steps (10)–(18) until the current field equals F plus 1; (20) turning off the cathode ray tube in the film printer; and (21) repeating steps (1)–(20) for each primary color.

10. A method of colored computer graphic photography comprising (a) extracting a color component of the input image into at least one field; (b) using an exposure time lookup table (FIG. 7) to translate each pixel in the field from color levels to exposure times; (c) determining number of memory fields per unit field by letting N equal number of bits needed to express maximum exposure time, letting M equal number of bits per pixel in memory and letting F equal N/M and if N/M is not an integer, rounding the number of fields up to next largest number; (d) dividing the input field into a predetermined number of memory fields, the first memory field corresponding to an input field containing the lowest M bits in each pixel exposure time, the second memory field containing the next M bits of each pixel exposure time and so on to highest memory field number; (e) turning a filter wheel in a film printer; (f) setting each level of an exposure mapping table respectively to off or on; (g) turning on a cathode ray tube in the film printer; (h) setting the variable current field to 1; (i) setting the variable number of exposures frames to 2(current field −1) where  indicates exponentiation; (j) setting the variable current color level to (2**M)−1; (k) waiting for a video signal vertical synchronization blanking period; (l) updating the exposure mapping table respectively to display or turn off pixels of the current color level; (m) displaying memory current field corresponding to the input level for one frame; (h) repeating step (m) until the field has been exposed the set number of exposure frames; (o) respectively decrementing or incrementing the current color level; (p) repeating steps (k)-(o) until the current color level reaches respectively the lowest or highest color level; (q) incrementing the current field; (r) repeating steps (i)-(q) until the current field equals F plus 1; (s) turning off the cathode ray tube in the film printer; and (t) repeating steps (a)-(s) for each primary color.

11. A method of colored computer graphic photography which achieves high resolution, comprising the steps of (a) extracting a color component of the input image into at least one field; (b) using an exposure time lookup table (FIG. 7) to translate each pixel in the field from color levels to exposure times; (c) determining number of memory fields per unit field by letting N equal number of bits needed to express maximum exposure time, letting M equal the number of bits per pixel in memory and letting F equal N/M and if N/M is not an integer, rounding the number of fields up to the next largest number; (d) dividing the input field into a predetermined number of memory fields, the first memory field corresponding to an input field containing the lowest M bits in each pixel exposure time, the second memory field containing the next M bits of each pixel exposure time and so on to the highest memory field number; (e) setting each level of an exposure mapping table respectively to off or on; (f) setting the variable current field to 1; (g) setting the variable number of exposure frames to 2(Curfield−1) where  indicates exponentiation; (h) setting the variable current color level to (2**M)−1; (i) waiting for a video signal vertical synchronization blanking period; (j) updating the exposure mapping table respectively to display or turn off pixels of the current color level; (k) displaying memory current field corresponding to the input field for one frame; (l) repeating step (m) until the field has been exposed the set number of exposure frames; (n) respectively decrementing or incrementing the current color level in accordance with the setting of step (e); (o) repeating steps (i)-(n) until the current color level reaches respectively the lowest or highest color level; (p) incrementing the current field; (q) repeating steps (g)-(p) until the current field equals F plus 1; and (r) repeating steps (a)-(q) for each primary color.

12. A method of computer graphic photography comprising (a) providing a component of an input image, (b) dividing the component into a plurality of separate interlaced fields in accordance with vertical resolution and shading resolution of the image, (c) transforming each field into a format and storing the formatted fields in a memory, (d) setting each level of an exposure mapping table respectively to off or on, (e) turning on a cathode ray tube in the film printer, (f) setting variable current level respectively to the highest or lowest level of the provided component, (g) determining number of exposure frames for all pixels in all fields of the current level from a lookup table (FIG. 7), (h) waiting for a video signal vertical synchronization blanking period, (k) updating the exposure mapping table respectively to display or turn off pixels of the current level, (j) displaying each of the image for one frame in an interlaced manner, (k) repeating step (j) until each field has been exposed for the determined number of exposure frames, (l) respectively decrementing or incrementing the current level in accordance with the setting of step (f), (m) repeating steps (g)-(l) until the current level reaches respectively the lowest or highest level, and (n) turning off the cathode ray tube of the film printer.

13. A method of computer graphic photography comprising (a) providing at least one field corresponding to a component of an input image (b) transforming the field into a format and storing the formatted field in a memory, (c) setting each level of an exposure mapping table respectively to off or on in accordance with vertical resolution and shading resolution of the image, (d) turning on a cathode ray tube in the film printer, (e) setting variable current level respectively to the highest or lowest level of the provided component, (f) determining number of exposure frames for all pixels in all fields of the current level from a lookup table (FIG. 7), (g) waiting for a video signal vertical synchronization blanking period, (h) updating the exposure mapping table respectively to display or turn off pixels of the current level, (i) displaying the field of the image for at least one frame, (j) respectively decrementing or incrementing the current level in accordance with the setting of step (e), (k) repeating steps (f)-(j) until the current level reaches respectively the lowest or highest color levels, and (l) turning off the cathode ray tube of the film printer.

14. A method of computer graphic photography which allows tradeoff between shading resolution and horizontal resolution, comprising the steps of (a) extracting a component of an input image into at least one field, (b) transforming the field into a format and storing the formatted field in a memory, (c) setting each level of an exposure mapping table respectively to off or on in accordance with vertical resolution and shading resolution of the image, and (d) updating the exposure mapping table respectively to display or turn off pixels of the current shading level.

15. A method of computer graphic photography comprising (a) providing a component of an input image; (b) dividing the component into a plurality of separate interlaced fields; (c) determining number of memory fields per unit field in accordance with vertical resolution and shading resolution of the image; (d) dividing each input field into the determined number of memory fields, mapping any pixel with a level between 1 and N−1 to a value in the first memory field while mapping all other pixels to 0, N being the number of distinct shading levels expressible per pixel, and mapping any pixel with a level between N and 2*(N−1) to the level −N+1 in a second memory field while mapping all other pixels to 0; (e) setting each level of an exposure mapping table respectively to off or on; (f) turning on a cathode ray tube in a film printer; (g) setting variable current field to 1; (h) setting variable current level to N−1; (i) using entry of a lookup table (FIG. 7) to determine the number of exposure frames for all pixels with the current level in each current field memory corresponding to each separate interlaced field of component; (j) waiting for a video signal vertical synchronization blanking period; (k) updating the exposure mapping table respectively to display or turn off pixels with the current level; (l) displaying the memory current field corresponding to each input field for one frame in an interlaced manner; (m) repeating step (l)

until each field has been exposed for the determined number of exposure frames; (n) respectively decrementing or incrementing the current level in accordance with the setting of step (e); (o) repeating steps (j)–(n) until the current level reaches respectively the lowest or highest level; (p) incrementing current field; (q) repeating steps (i)–(p) until the current field equals the determined number of memory fields plus one; and (r) turning off the cathode ray tube of the film printer.

16. A method of computer graphic photography comprising (a) providing a component of an input image into at least one field; (b) determining number of memory fields per input field; (c) dividing the input field into the determined number of memory fields in accordance with vertical resolution and shading resolution of the image, mapping any pixel with a level between 1 and N−1 to a value in the first memory field while mapping all other pixels to 0, and mapping any pixel with a level between N and 2*(N−1) to the level −N+1 in a second memory field while mapping all other pixels to 0, N being the number of distinct shading levels expressible per pixel in memory; (d) setting each level of an exposure mapping table respectively to off or on; (e) turning on a cathode ray tube in the film printer; (f) setting variable current field to 1; (g) setting variable current level to N−1; (h) using entry of a lookup table (FIG. 7) to determine number of exposure frames for all pixels with the current level in each current field memory corresponding to the field of component; (i) waiting for a video signal vertical synchronization blanking period; (j) updating the exposure mapping table respectively to display or turn off pixels with current level; (k) displaying the memory current field corresponding to the input field for one frame; (l) repeating step (k) until the field has been exposed for the determined number of the exposure frames; (m) respectively decrementing or incrementing the current level in accordance with the setting of step (f); (n) repeating steps (i)–(m) until the current level reaches respectively the lowest or highest level; (o) incrementing the current field; (p) repeating steps (h)–(o) until the current field equals the predetermined memory fields plus one; and (q) turning off the cathode ray tube in the film printer.

17. A method of computer graphic photography comprising (a) providing a component of an input image; (b) determining number of memory fields per input field; (c) dividing each input field into the determined number of memory fields in accordance with vertical resolution and shading resolution of the image, mapping any pixel with a level in one range in a first memory field of the predetermined number of memory fields while mapping all other pixels to 0 and mapping in respective others of the predetermined memory fields, any pixel with respective other ranges while mapping all other pixels to 0; (d) setting each level of an exposure mapping table respectively to off or on; (e) turning on a cathode ray tube in the film printer; (f) respectively setting variable current field to 1 or the number of predetermined memory fields; (g) setting the variable current level to N−1; (h) using entry of a lookup table (FIG. 7) to determine the number of exposure frames for all pixels with the current level in each current field memory corresponding to the field of component; (i) waiting for a video signal vertical synchronization blanking period; (j) updating the exposure mapping table respectively to display or turn off pixels with the current level; (k) displaying the memory current field corresponding to the input field for one frame; (l) repeating step (k) until the field has been exposed for the determined number of exposure frames; (m) respectively decrementing or incrementing the current level; (n) repeating steps (i)–(m) until the current level respectively reaches the highest or lowest level; (o) incrementing the current field; (p) repeating steps (h)–(o) until the current field respectivley equals one more than the predetermined memory fields or zero; and (q) turning off the cathode ray tube in the film printer.

18. A method of computer graphic photography comprising (a) providing a component of the input image; (b) dividing the provided component into separate interlaced fields, the number of separate interlaced fields depending on the vertical resolution of the input image; (c) using an exposure time lookup table (FIG. 7) to translate each pixel in each field from levels to exposure times; (d) determining number of memory fields per input field by letting N equal number of bits needed to express maximum exposure time, letting M equal number of bits per pixel in memory and letting F equal N/M and if N/M is not an integer, rounding the number of fields up to next largest number; (e) dividing each input field into the determined number of memory fields, the first memory field corresponding to an input field and containing the lowest M bits in each pixel exposure time, the second memory field containing the next M bits of each pixel exposure time and so on to the highest memory field number; (f) setting each level of an exposure mapping table respectively to off or on; (g) turning on a cathode ray tube in the film printer; (h) setting the variable current field to 1; (i) setting variable number of exposure frames to 2(current field −1) where  indicates exponentiation; (j) setting variable current level to (2**M)−1; (k) waiting for a video signal vertical synchronization blanking period; (l) updating the exposure mapping table respectively to display or turn off pixels of the current level; (m) displaying the memory current field corresponding to each input field for one frame in an interlaced manner; (n) repeating step (m) until each field has been exposed for the set number of exposure frames; (o) respectively decrementing or incrementing the current level; (p) repeating steps (k)–(o) until the current level reaches the highest or lowest level; (q) incrementing the current field; (r) repeating steps (i)–(q) until the current field equals F plus 1; and (s) turning off the cathode ray tube in the film printer.

19. A method of computer graphic photography comprising (a) providing at least one field corresponding to a component of an input image; (b) using an exposure time lookup table (FIG. 7) to translate each pixel in the field from levels to exposure times; (c) determining number of memory fields per input field by letting N equal number of bits needed to express maximum exposure time, letting M equal number of bits per pixel in memory and letting F equal N/M and if N/M is not an integer, rounding number of fields up to next largest number; (d) dividing the input field into a predetermined number of memory fields, the first memory field corresponding to an input field containing the lowest M bits in each pixel exposure time, the second memory field containing the next M bits of each pixel exposure time an so on to highest memory field number; (e) setting each level of an exposure mapping table respectively to off or on; (f) turning on a cathode ray tube in the film printer; (g) setting variable current field to 1; (h) setting variable number of exposure frames to 2(current field−1) where  indicates exponentiation; (i) setting variable current level to (2\*\*M)−1; (j) waiting for a video signal vertical synchronization blanking period; (k) updating the exposure mapping table respectively to display or turn off pixels of current level; (l) displaying memory current field corresponding to the input field for one frame; (m) repeating step (l) until the field has been exposed the set number of exposure frames; (n) respectively decrementing or incrementing current level; (o) repeating steps (j)–(n) until current level reaches the highest or lowest level; (p) incrementing current field; (q) repeating steps (h)–(p) until current field equals F plus 1; and (r) turning off the cathode ray tube in the film printer.

20. A method of computer graphic photography which achieves high resolution, comprising the steps of (a) providing at least one field corresponding to a component of an input image; (b) using an exposure time lookup table (FIG. 7) to translate each pixel in the field from levels to exposure times; (c) determining number of memory fields per input field by letting N equal number of bits needed to express maximum exposure time, letting M equal number of bits per pixel in memory and letting F equal N/M and if N/M is not an integer, rounding number of fields up to next largest number; (d) dividing the input field into a predetermined number of memory fields, the first memory field corresponding to an input field containing the lowest M bits in each pixel exposure time, the second memory field containing the next M bits of each pixel exposure time and so on to the highest memory field number; (e) setting each level of an exposure mapping table respectively to off or on; (f) setting variable current field to 1; (g) setting variable number of exposure frames to 2\*\*(Curfield−1) where \*\* indicates exponentiation; (h) setting the variable current level to (2\*\*M)−1; (i) waiting for a video signal vertical synchronization blanking period; (j) updating the exposure mapping table respectively to display or turn off pixels of the current level; (k) displaying the memory current field corresponding to the input field for one frame; (l) repeating step (m) until the field has been exposed the set number of exposure frames; (n) respectively decrementing or incrementing the current level; (o) repeating steps (i)–(n) until the current level reaches the highest or lowest level; (p) incrementing current field; and (q) repeating steps (g)–(p) until the current field equals F plus 1.

21. A system for computer graphic photography comprising a film printer having a cathode ray tube and a computer having a central processing unit, interconnecting circuitry comprising internal data and internal address buses; the system further including interface means for providing buffering between a system bus from the central processing unit and the internal data and address buses; register means including latch means coupled to the internal data bus and responsive to data thereon which can be set under program control by the central processing unit for supplying output to first address lines; controller means coupled to the internal address bus and responsive to signals thereon for developing vertical synchronization signals, horizontal synchronization signals and output to second address lines when an image is to be displayed on the cathode ray tube for printing; random access memory means coupled to the internal data bus for receiving pixel data of an image from the central processing unit via the interface means, the random access memory means including address receiving input means; multiplex means coupled to the internal address bus, to the register means and to the controller means and responsive thereto for selecting source of addressing lines to the random access memory means; a memory device for providing an exposure mapping table containing display information for multiple display pixels; exposure mapping table address multiplex means coupled to data output means of the random access memory means and to the internal address bus for selecting address lines from the internal bus whenever the central processing unit is reading or writing the memory device and address lines from the data output of the random access memory means whenever an image is being displayed on the cathode ray tube; buffer means coupled between the data output means of the random access memory means and the internal data bus for enabling output from the random access memory means to be placed on the internal data bus whenever the central processing unit reads data from the random access memory means; bidirectional buffer means coupled between the memory device and the internal data bus for enabling locations in the memory device to be set or read by the central processing unit whenever the central processing unit writes or reads the memory device; shift register means coupled to and responsive to output from the memory device for serializing data therefrom to generate video data when ever an image is being displayed on the cathode ray tube; vertical and horizontal synchronization delay means coupled to the internal data bus and to the controller means and responsive to signals therefrom the delaying the vertical and horizontal synchronization signals by a programmed amount of time to provide fine control over vertical and horizontal position of the image on the cathode ray tube; video circuit means coupled to the controller, to the vertical and horizontal synchronization delay means and to the shift register means and responsive to signals therefrom for supplying video and synchronization signals to the film printer.

22. The system according to claim 21, wherein said interface means includes means for decoding read and write requests from the central processing unit.

23. The system according to claim 22, wherein said memory device comprises a 256 location by four bit memory device.

24. The system according to claim 23, wherein said random access memory means comprises a random access memory array.

25. The system according to claim 24, wherein said random access memory array is a 256 kilobyte memory.

26. The system according to claim 24, wherein said random access memory array is a one megabyte memory.

27. The system according to claim 21, wherein said memory device comprises a 256 location by four bit memory device.

28. The system according to claim 27, wherein said random access memory means comprises a random access memory array.

29. The system according to claim 28, wherein said access memory array is a 256 kilobyte memory.

30. The system according to claim 28, wherein said random access memory array is a one megabyte memory.

31. The system according to claim 21, wherein said random access memory means comprises a random access memory array.

32. The system according to claim 31, wherein said random access memory array is a 256 kilobyte memory.

33. The system according to claim 31, wherein said random access memory array is a one megabyte memory.

34. A system for computer graphic photography which comprises a computer having a central processing unit, circuitry including internal data and internal address buses; interface means for providing buffering between a system bus from the central processing unit and the internal data and address buses; register means including latch means coupled to the internal data bus and responsive to data thereon which can be set under program control by the central processing unit for supplying output to first address lines; controller means coupled to the internal address bus and responsive to signals thereon for developing synchronization signals and output to second address lines when an image is to be displayed for printing; random access memory means coupled to the internal data bus for receiving pixel data of an image from the central processing unit via the interface means, the random access memory means including address receiving input means; multiplex means coupled to the internal address bus, to the register means and to the controller means and responsive to addresses therefrom for selecting source of addressing lines to the random access memory means; a memory device for providing an exposure mapping table containing display information for multiple display pixels; exposure mapping table address multiplex means coupled to data output means of the random access memory means and to the internal address bus for selecting address lines from the internal bus whenever the central processing unit is reading or writing the memory device and address lines from the data output of the random access memory means whenever an image is to be displayed; buffer means coupled between the data output means of the random access memory means and the internal data bus for enabling output from the random access memory means to be placed on the internal data bus whenever the central processing unit reads data from the random access memory means; bidirectional buffer means coupled between the memory device and the internal data bus for enabling locations in the memory device to be set or read by the central processing unit whenever the central processing unit writes or reads the memory device; and shift register means coupled to and responsive to output from the memory device for serializing data therefrom the generate video data whenever an image is to be displayed for printing.

35. The system according to claim 34, wherein said memory device comprises a 256 location by four bit memory device.

36. The system according to claim 35, wherein said random access memory means comprises a random access memory array.

37. The system according to claim 36, wherein said random access memory array is a 256 kilobyte memory.

38. The system according to claim 36, wherein said random access memory array is a one megabyte memory.

39. The system according to claim 34, wherein said memory device comprises a 256 location by four bit memory device.

40. The system according to claim 39, wherein said random access memory means comprises a random access memory array.

41. The system according to claim 40, wherein said access memory array is a 256 kilobyte memory.

42. The system according to claim 40, wherein said random access memory array is a one megabyte memory.

43. The system according to claim 34, wherein said random access memory means comprises a random access memory array.

44. The system according to claim 43, wherein said random access memory array is a 256 kilobyte memory.

45. The system according to claim 43, wherein said random access memory array is a one megabyte memory.

46. The signal processing circuit comprising data and address buses; interface means for providing buffering between a source and the data and address buses; register means including latch means coupled to the data bus and responsive to data thereon which can be set under program control for supplying output to first address lines; controller means coupled to the address bus and responsive to signals thereon for developing vertical synchronization signals and output to second address lines when an image is to be displayed for printing; random access memory means coupled to the data bus for receiving pixel data of an image via the interface means, the random access memory means including address receiving input means; multiplex means coupled to the address bus, to the register means and to the controller means and responsive thereto for selecting source of addressing lines to the random access memory means; a memory device for providing an exposure mapping table containing display information for multiple display pixels; exposure mapping table address multiplex means coupled to data output means of the random access memory means and to the address bus for selecting address lines from the bus whenever reading or writing of the memory device occurs and address lines from the data output of the random access memory means whenever an image is to be displayed; buffer means coupled between the data output means of the random access memory and the data bus for enabling output from the random access memory means to be placed on the data bus whenever data from the random access memory means is read; bidirectional buffer means coupled between the memory device and the data bus for enabling locations in the memory device to be set or read; shift register means coupled to and responsive to output from the memory device for serializing data therefrom to generate video data whenever an image is to be displayed for printing; vertical and horizontal synchronization delay means coupled to the data bus and to the controller means and responsive to signals therefrom the delaying the vertical and horizontal synchronization signals by a programmed amount of time to provide fine control over vertical position of the image; and video circuit means coupled to the controller, to the vertical and horizontal synchronization delay means and to the shift register means and responsive to signals therefrom for supplying output video and synchronization signals.

47. A signal processing circuit comprising data and address buses; interface means for providing buffering between a source and the data and address buses; register means including latch means coupled to the data bus and responsive to data thereon which can be set for supplying output to first address lines; controller means coupled to the address bus and responsive to signals thereon for developing synchronization signals and output to second address lines when an image is to be displayed for printing; random access memory means coupled to the data bus for receiving pixel data of an image via the interface means, the random access memory means including address receiving input means; multiplex means coupled to the address bus, to the register means and to the controller means and responsive to addresses therefrom for selecting source of addressing lines to the random access memory mean; a memory device for providing an exposure mapping table containing display information for multiple display pixels; exposure mapping table address multiplex means coupled to data output means of the random access memory means and to the address bus for selecting address lines from the bus whenever reading or writing the memory device occurs and address lines from the data output of the random access memory means whenever an image is to be displayed for printing; buffer means coupled between the data output means of the random access memory and the data bus for enabling output from the random access memory means to be placed on the data bus whenever data from the random access memory means is read; bidirectional buffer means coupled between the memory device and the data bus for enabling locations in the memory device to be set or read; shift register means coupled to and responsive to output from the memory device for serializing data therefrom to generate video data whenever an image is to be displayed; and video circuit means operatively arranged to respond to the synchronization signals and the video data for supplying output video and synchronization signals.

48. A system for computer graphic photography comprising a film printer, an address bus and means for providing pixel data of an image, random access memory means coupled to said means for providing to receive the pixel data of an image therefrom for providing data output, address multiplexing means coupled to said random access memory means to receive the data output therefrom and coupled to said address bus to receive address signals, and a memory device coupled to said address multiplexing means for providing an exposure mapping table containing at each memory location display information for multiple display pixels, said multiplexing means selecting address lines from the address bus whenever the memory device is being read or written and from the random access memory means whenever an image is to be printed.

49. The system according to claim 48, wherein said memory device comprises a 256 location by four bit memory device.

50. The system according to claim 49, wherein said random access memory means comprises a random access memory array.

51. The system according to claim 50, wherein said random access memory array is a 256 kilobyte memory.

52. The system according to claim 50, wherein said random access memory array is a one megabyte memory.

53. The system according to claim 48, wherein said random access, memory means comprises a random access memory array.

54. The system according to claim 53, wherein said access memory array is a 256 kilobyte memory.

55. The system according to claim 53, wherein said random access memory array is a one megabyte memory.

* * * * *